US008744799B2

(12) United States Patent
Dods et al.

(10) Patent No.: US 8,744,799 B2
(45) Date of Patent: Jun. 3, 2014

(54) SYSTEM AND METHOD FOR ANALYZING MOVEMENTS OF AN ELECTRONIC DEVICE

(75) Inventors: Jeffrey Alton Hugh Dods, Kitchener (CA); Sean Bartholomew Simmons, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1164 days.

(21) Appl. No.: 12/237,812

(22) Filed: Sep. 25, 2008

(65) Prior Publication Data

US 2010/0073284 A1    Mar. 25, 2010

(51) Int. Cl.
*G06F 3/01* (2006.01)
*G06F 3/02* (2006.01)
*G06F 3/0484* (2013.01)
*G06F 3/0485* (2013.01)

(52) U.S. Cl.
USPC ........................................... 702/150; 702/141

(58) Field of Classification Search
CPC .............................. G06F 3/017; G06F 3/04815
USPC ................................................. 702/141, 150
See application file for complete search history.

(56) References Cited

U.S. PATENT DOCUMENTS

| 7,668,340 B2 * | 2/2010 | Cohen et al. ................... 382/103 |
| 2005/0212755 A1 * | 9/2005 | Marvit .......................... 345/156 |
| 2005/0212760 A1 * | 9/2005 | Marvit et al. .................. 345/156 |
| 2005/0212767 A1 * | 9/2005 | Marvit et al. .................. 345/158 |
| 2005/0212911 A1 * | 9/2005 | Marvit et al. .................. 348/154 |
| 2007/0271036 A1 * | 11/2007 | Atarashi ....................... 701/211 |
| 2008/0192005 A1 * | 8/2008 | Elgoyhen et al. ............. 345/158 |
| 2010/0040292 A1 * | 2/2010 | Clarkson ....................... 382/201 |
| 2010/0050134 A1 * | 2/2010 | Clarkson ....................... 715/863 |
| 2010/0138180 A1 * | 6/2010 | Sugihara et al. ................ 702/94 |
| 2010/0223582 A1 * | 9/2010 | Dods ............................. 715/863 |
| 2011/0080339 A1 * | 4/2011 | Sun et al. ...................... 345/157 |
| 2011/0080475 A1 * | 4/2011 | Lee et al. ........................ 348/77 |
| 2012/0110518 A1 * | 5/2012 | Chan et al. .................... 715/863 |

FOREIGN PATENT DOCUMENTS

| EP | 0666544 B1 | 8/2001 |
| GB | 2419433 A | 4/2006 |

OTHER PUBLICATIONS

Longbin Chen, Rogerio Feris, Matthew Turk. Efficient Partial Shape matching Using Smith-Waterman Algorithm. Paper presented at IEEE Computer Society Conference on Computer Vision and Pattern Recognition Workshops. Jun. 2008.*

(Continued)

*Primary Examiner* — John Breene
*Assistant Examiner* — Yaritza H Perez Bermudez
(74) *Attorney, Agent, or Firm* — McCarthy Tétrault LLP

(57) ABSTRACT

The disclosure relates to a system and method for analyzing movements of a handheld electronic device. The system comprises: memory; a microprocessor; a first module to generate movement data responsive to movements of the device; a second module providing instructions to the microprocessor to map the movement data to a string representation relating to symbols in a spatial coordinate system associated with the device and store the string representation in the memory; and a third module. The third module provides instructions to the microprocessor to analyze data relating to the string representation against data relating to a gesture string representing a gesture related to a command for the device to determine if the gesture has been imparted on the device; and if the string representation sufficiently matches the gesture string, executes a command associated with the gesture on the device.

16 Claims, 24 Drawing Sheets

(56) References Cited

OTHER PUBLICATIONS

Chuanjun Li, S.Q. Cheng and B. Prabhakaran. Segementation and Recognition of Motion Streams by Similarity Search. ACM Transactions on Multimedia Computing, Communication and Applications. vol. 03:03. Aug. 2007. pp. 1-26.

Daniel E. Riedel, Svetha Venkatesh and Wanquan Liu. A Smith-Waterman Local Alignment Approach for Spatial Activity Recognition. Proceedings of the IEEE International Conference on Video and Signal Based Surveillance. Nov. 2006.

* cited by examiner

Constructing D(i, j)

| T{m} \ P{n} | { BF | C0 | C2 | C4 | C7 } |
|---|---|---|---|---|---|
|  | 0 | 0 | 0 | 0 | 0 | 0 |
| A2 | 0 | 0 | 1 | ½ | 0 | 0 |
| FF | 0 | 0 | ½ | 0 | 0 | 0 |
| C7 | 0 | 1 | ½ | 0 | 1 | 1 |
| C0 | 0 | ½ | 2 | ½ | 1 | ½ |
| C2 | 0 | 0 | 1 ½ | 3 | 2 ½ | 2 |
| A2 | 0 | 0 | 1 | 2 ½ | 2 | 1 ½ |
| C2 | 0 | 0 | ½ | 2 | 3 ½ | 3 |
| BF | 0 | 1 | ½ | 1 ½ | 3 | (4 ½) |
| FF | 0 | ½ | ½ | 1 | ½ | 4 |

ALIGNMENT SCORE (maximum value)

Fig. 10A $D_1(i, j)$ and $D_2(i, j)$ $D_{1(i,j)}$ { BF  C0  C2  C4  C7 } P{ n }

| | BF | C0 | C2 | C4 | C7 | |
|---|---|---|---|---|---|---|
| | 0 | 0 | 0 | 0 | 0 | 0 |
| A2 | 0 | 0 | 1 | ½ | 0 | 0 |
| FF | 0 | 0 | ½ | 0 | 0 | 0 |
| C7 | 0 | 1 | ½ | 0 | 1 | 1 |
| C0 | 0 | ½ | 2 | 1½ | 1 | ½ |

$T_1\{m"\}$ spans FF and C7 rows.

$D_{2(i,j)}$ { BF  C0  C2  C4  C7 } P{ n }

| | BF | C0 | C2 | C4 | C7 | |
|---|---|---|---|---|---|---|
| | 0 | ½ | 2 | 1½ | 1 | ½ |
| C2 | 0 | 0 | 1½ | 3 | 2½ | 2 |
| A2 | 0 | 0 | 1 | 2½ | 2 | 1½ |
| C2 | 0 | 0 | ½ | 2 | 3½ | 1 |
| BF | 0 | 1 | ½ | 1½ | 3 | (4½) |
| FF | 0 | ½ | ½ | 1 | 2½ | 4 |

Top Row of $D_2$ initialized by Last Row of $D_1$

ALIGNMENT SCORE

Fig. 10B $S(x_i, y_j)$

|    | A2 | C0 | C1 | C2 | C4 | C7 | BF | FF |
|----|----|----|----|----|----|----|----|----|
| A2 | +1 | +1 | -1 | -1 | -1 | -1 | -1 | -1 |
| C0 | +1 | +1 | +1 | -1 | -1 | -1 | -1 | -1 |
| C1 | -1 | +1 | +1 | +1 | -1 | -1 | -1 | -1 |
| C2 | -1 | -1 | +1 | +1 | +1 | -1 | -1 | -1 |
| C4 | -1 | -1 | -1 | +1 | +1 | +1 | -1 | -1 |
| C7 | -1 | -1 | -1 | -1 | +1 | +1 | +1 | -1 |
| B7 | -1 | -1 | -1 | -1 | -1 | +1 | +1 | -1 |
| FF | -1 | -1 | -1 | -1 | -1 | -1 | -1 | 1  |

Fig. 10C

|   | P₂{n} |   |   |   |   |   | P₂{n'} |   |   |   |   |   |
|---|---|---|---|---|---|---|---|---|---|---|---|---|
|   | {BF | C0 | C2 | C4 | C7} | {A2 | FF | C0 | C2 | C4 | C7} |   |
|   | 0 | 0 | 0 | 0 | 0 | 0 | 0 | 0 | 0 | 0 | 0 | 0 |
| A2 | 0 | 0 | 1 | ½ | 0 | 0 | 0 | 1 | ½ | 0 | 0 | 0 | 1 |
| FF | 0 | 0 | ½ | 0 | 0 | 0 | 0 | ½ | 2 | 1½ | 1 | ½ | 0 |
| C7 | 0 | 1 | ½ | 0 | 1 | 1 | 0 | 0 | 1½ | 3 | 2½ | 2 | 1½ |
| C0 | 0 | ½ | 2 | 1½ | 1 | 1½ | 0 | 1 | 1 | 2½ | 4 | 3½ | 3 |
| C2 | 0 | 0 | 1½ | 3 | 2½ | 2 | 0 | ½ | ½ | 2 | 3½ | 5 | 4½ |
| A2 | 0 | 0 | 1 | 2½ | 2 | 1½ | 0 | 1 | ½ | 1½ | 3 | 4½ | (6) |
| C2 | 0 | 0 | ½ | 2 | 3½ | 3 | 0 | 0 | 0 | 1½ | 2½ | 4 | 5½ |
| BF | 0 | 1 | ½ | 1½ | 3 | (4½) | 0 | 0 | 0 | 1 | 2 | 3½ | 5 |
| FF | 0 | ½ | ½ | 1 | 2½ | 4 | 0 | 0 | 0 | ½ | 1½ | 3 | 4½ |

T{m} (row label)

Alignment Score 1 → (4½)

Alignment Score 2 → (6)

Fig. 10D

SYSTEM AND METHOD FOR ANALYZING MOVEMENTS OF AN ELECTRONIC DEVICE

FIELD OF DISCLOSURE

This disclosure relates to a system and method for analyzing movements of an electronic device. In particular, the disclosure relates to analyzing movements of a device to identify gestures as input signals for the device.

BACKGROUND

Current wireless handheld mobile communication devices perform a variety of functions to enable mobile users to stay current with information and communications, such as e-mail, corporate data and organizer information while they are away from their desks. Such devices have displays and sophisticated operating systems providing Graphical User Interfaces (GUIs) that impart various static and moving images to the user.

One navigation device for a GUI of a handheld device is a trackball or trackwheel. Movement of the trackball or trackwheel is commonly translated into a movement of a cursor, which may involve highlighting an icon. However utilizing a trackball or trackwheel is not inherently intuitive. Other navigation devices utilize a movement of the device itself. However interpreting such movements with present algorithms is computationally demanding and requires relatively large processing power and memory storage, especially for a handheld device.

There is a need for a system and method which addresses deficiencies in the prior art.

BRIEF DESCRIPTION OF THE DRAWINGS

The disclosure provides, by way of example only, with reference to the accompanying drawings, in which:

FIG. 10A is a block diagram of a dynamic programming matrix resulting from evaluating a stored pattern gesture against movement data of the device of FIG. 1, according to an embodiment;

FIG. 10B is a block diagram of two dynamic programming matrices resulting from evaluating a stored pattern gesture against two sets of movement data of the device of FIG. 1, according to an embodiment;

FIG. 10C is an exemplary substitution matrix generated as part of processing movement data by the device of FIG. 1 according to an embodiment;

FIG. 10D is a block diagram of a dynamic programming matrix resulting from evaluating two stored pattern gestures against movement data of the device of FIG. 1, for multiple gestures according to an embodiment;

DETAILED DESCRIPTION OF AN EMBODIMENT

Figure 1:
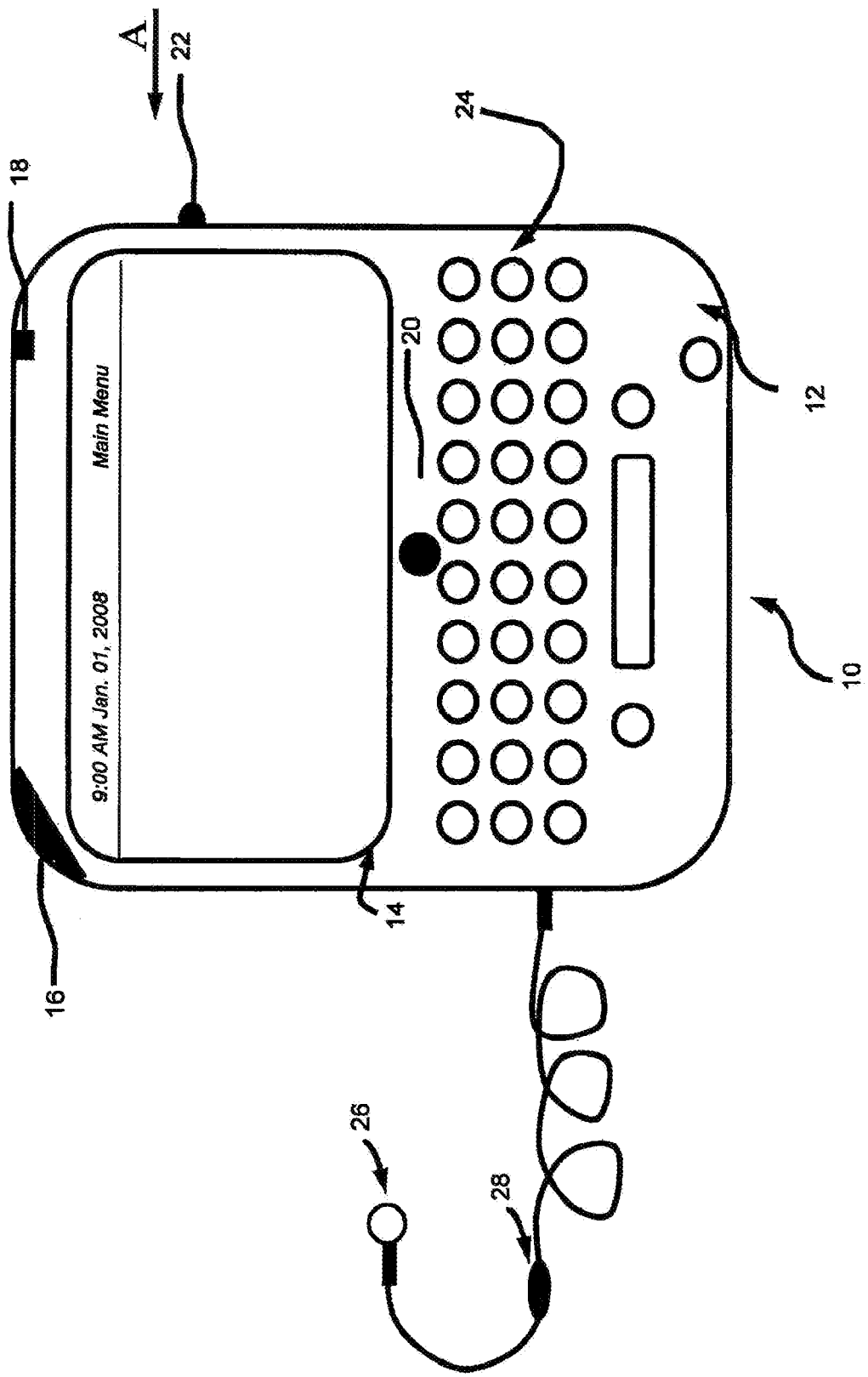
FIG. 1 is a schematic representation of an electronic device having a gesture analysis system and a movement detection system in accordance with an embodiment.

The description which follows and the embodiments described therein are provided by way of illustration of an example or examples of particular embodiments of the principles of the present disclosure. These examples are provided for the purposes of explanation and not limitation of those principles and of the disclosure. In the description which follows, like parts are marked throughout the specification and the drawings with the same respective reference numerals.

In a first aspect, a method for analyzing movements of a handheld electronic device is provided. The method comprises: tracking movement data for the device; mapping the movement data to a string representation; analyzing the string representation for the device against a gesture string representing a gesture related to a command for the device to determine if the gesture has been imparted on the device; and if the string representation matches the gesture string, executing a command associated with the gesture on the device.

In the method, analyzing the string representation may utilize earlier movement data, if available, for the device.

In the method, the string representation may be compared against a threshold to determine if the string representation matches the gesture string representation.

In the method, the movements may be mapped to enumeration symbols arranged in a spatial coordinate system associated with the device.

In the method, the spatial coordinate system may provide a locus of points from the origin of a coordinate system for the device. The covering of points may have icosahedral symmetry about the device.

In the method, the mapping the movement data to the string representation may comprise: converting the movement data to a movement vector representing the movement; calculating a total acceleration vector for the device, the total acceleration vector including the movement vector and a tilt vector for the device; and mapping the total acceleration vector against the spatial coordinate system to identify an enumeration symbol of the enumeration symbols that matches the movement.

In the method, an accelerometer may provide the movement data for the device.

In the method, analyzing the string representation may utilize a threshold that discards contiguously repeated enumeration symbols in the string representation.

In the method, the string representation may be analyzed against the threshold using an edit distance algorithm, such as a Levenshtein edit distance algorithm or a Smith-Waterman algorithm. Additionally or alternatively, another sequence alignment algorithm may be used.

In the method, analyzing the string representation may comprise: constructing a matrix of data containing the string representation and the gesture string; and calculating a matching score for the string representation against the gesture string by traversing a subset of the matrix to generate matching scores for values in the string representation against the gesture string or strings.

In the method, constructing the matrix of data may use earlier movement data of the device; and calculating the matching score may utilize a Smith-Waterman algorithm to recursively traverse a subset of the matrix until a stop condition is encountered.

In the method, the matrix is may be a dynamic programming matrix D(i,j). The matrix may have dimensions m×n, where m is the length of the string representation and n is the length of the gesture string. The matrix may have components of the string representation being identified with the m dimension and components of the gesture string being identified with the n dimension. The matrix may have a leftmost column D(i,0)=0, where i=0 . . . m; and a top row D(0,j)=0, where j=0 . . . n. The remaining elements in the matrix may be set to be the minimum value of 0 or one of:

$$D(i, j) =$$
$$\max\{0 [or] D(i-1, j) + \text{a gap penalty} [or] D(i, j-1) + \text{the gap penalty} [or]$$
$$D(i-1, j-1) + \text{the } i, j\text{th entry of the substitution matrix}\}.$$

The substitution matrix may be based on geometrical relationships between vertices of the spatial coordinate system.

In the method, calculating the matching score may utilize the string representation and the earlier movement data collectively to determine if the gesture string straddles the string representation and the earlier movement data.

In a second aspect, a system for analyzing movements of a handheld electronic device is provided. The system comprises: a memory storage device; a microprocessor; a first module to generate movement data for the device responsive to movements of the device; a second module providing instructions to the microprocessor to map the movement data to a string representation relating to enumeration symbols arranged in a spatial coordinate system associated with the device and store the string representation in the memory storage device; and a third module. The third modules provides instructions to the microprocessor: to analyze data relating to the string representation and earlier movement data, if available, for the device against data relating to a gesture string representing a gesture related to a command for the device to determine if the gesture has been imparted on the device; and if the string representation is compared against a threshold to determine if the string representation matches the gesture string, to execute a command associated with the gesture on the device.

In the system, the second module may: convert the movement data to a movement vector representing the movement; calculate a total acceleration vector for the device (again, the total acceleration vector including the movement vector and a tilt vector for the device); and map the total acceleration vector against the spatial coordinate system to identify an enumeration symbol of the enumeration symbols that matches the movement.

In the system, the first module may comprise an accelerometer to provide the movement data for the device.

In the system, the third module may analyze the string representation against the threshold using an edit distance algorithm, such as a Levenshtein edit distance algorithm or a Smith-Waterman algorithm. Additionally or alternatively, another sequence alignment algorithm may be used.

In the system, the third module may provide instructions to the microprocessor to: construct a matrix of data containing the string representation and the gesture string; and calculate a matching score for the string representation against the gesture string by traversing a subset of the matrix to generate matching scores for values in the string representation against the gesture string.

In the system, the matrix may be a dynamic programming matrix D(i,j). The matrix may have dimensions m×n, where m is the length of the string representation and n is the length of the gesture string. The matrix may have components of the string representation being identified with the m dimension and components of the gesture string being identified with the n dimension. The matrix may have a leftmost column D(i,0)=0, where i=0 . . . m; and a top row D(0,j)=0, where j=0 . . . n. The remaining elements in the matrix may be set to be the minimum value of 0 or one of:

$$D(i, j) =$$
$$\max\{0 [or] D(i-1, j) + \text{a gap penalty} [or] D(i, j-1) + \text{the gap penalty} [or]$$
$$D(i-1, j-1) + \text{the } i, j\text{th entry of the substitution matrix}\}.$$

In the system, the third module may utilize the string representation and the earlier movement data collectively to determine if the gesture string straddles the string representation and the earlier movement data.

In other aspects, various combinations of sets and subsets of the above aspects are provided.

Generally, an embodiment provides a system and method of tracking movements of a (handheld) device and evaluating the movements against stored representations of selected movements of interest, referred to herein as "gestures". An embodiment utilizes a quantization scheme to use a three-dimensional coordinate system to map movements of the device and stored gestures against the coordinate system. The coordinate system has a predetermined set of symbols to define specific vertices in the system. The symbols may be any predefined set of characters, including ASCII set characters, integers, or any other enumeration scheme. A detected movement is quantized, where the movement is broken down into segments and each segment is mapped (at least as an approximation) onto the vertices in the coordinate system. As such, as a movement progresses through each of the identified vertices, a string of vertices can be identified with the movement. As the vertices have symbols (herein provided as text symbols), the symbols at the mapped vertices for the movement provide a "text string", which represents the movement as mapped against the coordinate system. Meanwhile, a set of (input) gestures, each representing a command implemented as a movement of the device which is recognized by an application operating on the device, are also quantized against the coordinate system. As such, the gestures are associated with a discrete sequence of symbols (again, which may be represented by ASCII set characters, or integers, or any other convenient enumeration scheme) and are referred to below as "pattern strings". As such, the term "string representation" is used herein as a generic term identifying any string of vertices for a coordinate system relating to a detected movement or a gesture. The string representation may be comprised of several discrete symbols, as noted above. There may be a string representation for a pattern for a gesture (namely, the "pattern string") and/or for a detected movement of the device. A string representation may map other movements, offsets, default positions, etc. that may be used in analysing movements of the device. As a string representation is comprised of discrete elements, its elements may be processed and manipulated using mathematical functions, as described herein. For convenience, the phrase "text string" is short form for a string representation of detected movements that cross identified vertices in the coordinate system for the device; the phrase "pattern string" is short form for a string representation of a gesture that has elements that cross identified vertices in the coordinate system for the device.

The sets of pattern strings for gestures may be stored or made available to the device so that they can be compared against real-time movements of the device as encoded in the text strings. At certain instances, recently detected movements of the device (represented by text strings) may be compared against sets of stored gestures (represented by stored pattern strings) to evaluate whether a movement matches a stored gesture. An algorithm, expanded upon a basic Smith-Waterman algorithm may be used as part of the evaluation. The evaluation may have thresholds to set a tolerance of deviations from a gesture and the detected movements.

Exemplary details of aspect of embodiments are provided herein. First, a description is provided on general concepts and features of an embodiment as provided in a device. Then, further detail is provided on the system, data and algorithms used to process detected movements of a device and to compare the movements against stored representations of gestures.

Figure 2:
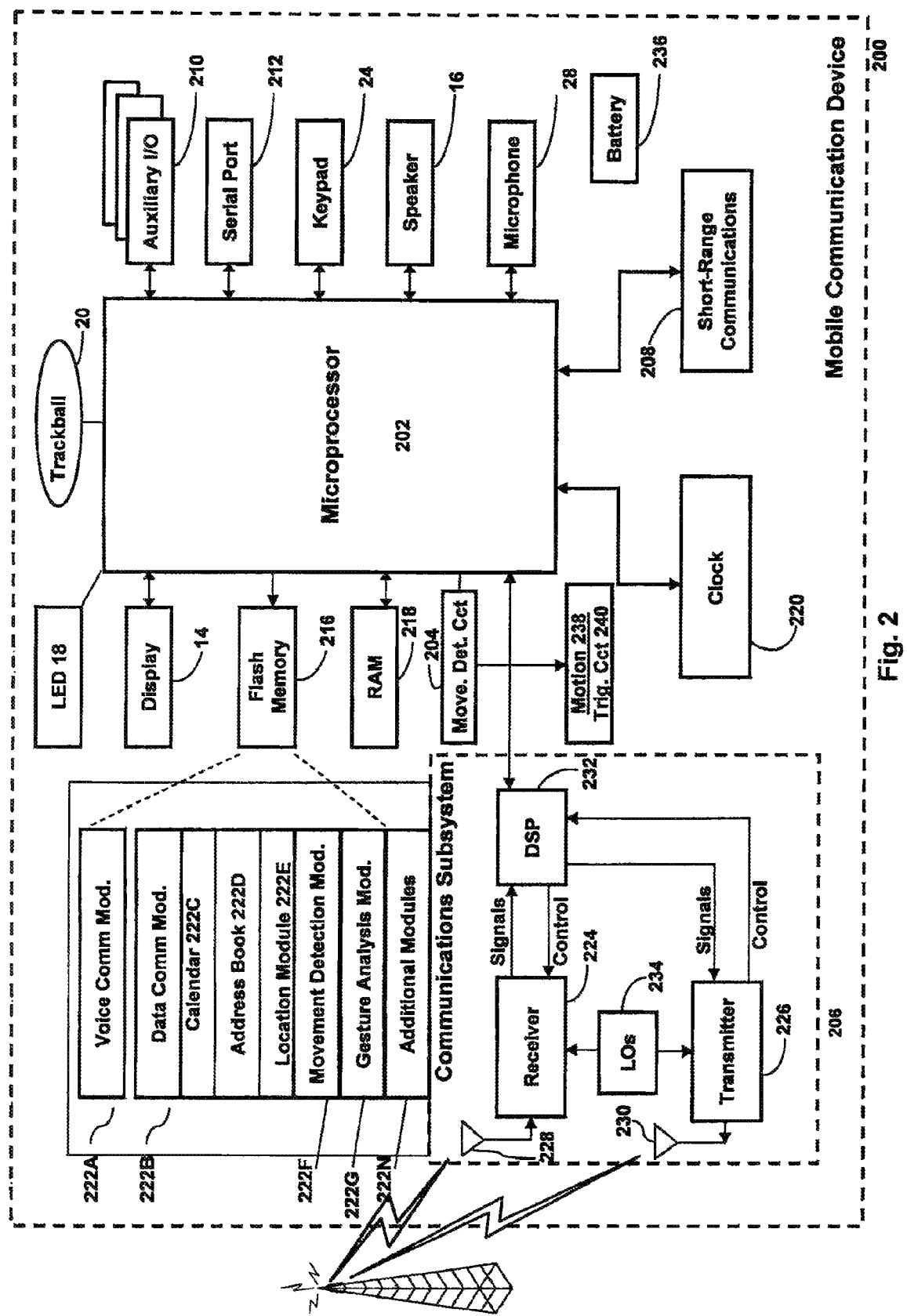
FIG. 2 is a block diagram of certain internal components and the movement adjustment system in device of FIG. 1.

As such, referring to FIGS. 1 and 2, some general features of a device are first provided. FIG. 1 provides general features of an electronic device for receiving electronic communications in accordance with an embodiment of the disclosure, which is indicated generally at 10. In the present embodiment, electronic device 10 is based on a computing platform having functionality of an enhanced personal digital assistant with cell phone and e-mail features. It is, however, to be understood that electronic device 10 can be based on construction design and functionality of other electronic devices, such as smart telephones, desktop computers pagers or laptops having telephony equipment. In a present embodiment, electronic device 10 includes a housing 12, an LCD 14, speaker 16, an LED indicator 18, a trackball 20, an ESC ("escape") key 22, keypad 24, a telephone headset comprised of an ear bud 26 and a microphone 28. Trackball 20 and ESC key 22 can be inwardly depressed along the path of arrow "A" as a means to provide additional input to device 10.

It will be understood that housing 12 can be made from any suitable material as will occur to those of skill in the art and may be suitably formed to house and hold all components of device 10.

Device 10 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Wireless WAN (IMS), Wireless MAN (Wi-max or IEEE 802.16), Wireless LAN (IEEE 802.11), Wireless PAN (IEEE 802.15 and Bluetooth), etc. and any others that support voice. Additionally, a Bluetooth network may be supported. Other embodiments include Voice over IP (VoIP) type streaming data communications that can simulate circuit-switched phone calls. Ear bud 26 can be used to listen to phone calls and other sound messages and microphone 28 can be used to speak into and input sound messages to device 10.

Referring to FIG. 2, functional components of device 10 are provided in schematic 200. The functional components are generally electronic, structural or electromechanical devices. In particular, microprocessor 202 is provided to control and receive almost all data, transmissions, inputs and outputs related to device 10. Microprocessor 202 is shown schematically as coupled to keypad 24 and other internal devices. Microprocessor 202 preferably controls the overall operation of the device 10 and its components. Exemplary microprocessors for microprocessor 202 include microprocessors in the Data 950 (trade-mark) series, the 6200 (trade-mark) series and the P4900 (trade-mark) series, all available at one time from Intel Corporation. Microprocessor 202 is connected to other elements in device 10 through a series of electrical connections to its various input and output pins. Microprocessor 202 has an IRQ input line which allows it to receive signals from various devices. Appropriate interrupt firmware is provided which receives and reacts to the signals detected on the IRQ line. Movement detection module 204 provides analysis of input signals to determine the whether device 10 has been moved or whether its orientation has changed.

In addition to microprocessor 202, other internal devices of the device 10 are shown schematically in FIG. 2. These include: display 14; speaker 16; keypad 24; communication sub-system 206; short-range communication sub-system 208; auxiliary I/O devices 210; serial port 212; microphone 28; flash memory 216 (which provides persistent storage of data); random access memory (RAM) 218; internal clock 220 to track and synchronize applications and other device sub-systems (not shown). Device 10 is preferably a two-way radio frequency (RF) communication device having voice and data communication capabilities. In addition, device 10 preferably has the capability to communicate with other computer systems through networks such as the Internet.

Operating system software executed by the microprocessor 202 is preferably stored in a computer readable medium, such as flash memory 216, but may be stored in other types of memory devices, such as read only memory (ROM) or similar storage element. In addition, system software, specific device applications, or parts thereof, may be temporarily loaded into a volatile store, such as RAM 218. Communication signals received by the mobile device may also be stored to RAM 218.

Microprocessor 202, in addition to its operating system functions, enables execution of software applications on device 10. A set of software (and/or firmware) applications, referred to generally as applications 222, that control basic device operations, such as voice communication module 222A and data communication module 222B, may be installed on the device 10 during manufacture or downloaded thereafter. As well, additional software modules, which may be for instance a personal information manager (PIM) application, may be installed during manufacture or downloaded thereafter into device 10. Data associated with each application can be stored in flash memory 216.

Telephone application 222A (which is associated with icon 304A) provides an interface to allow the user of device 10 to initiate a telephone call on device 10. It also provides a GUI to store and list a record of telephone calls made, telephone calls received and voice-mail messages stored by device 10.

Email application 222B (which is associated with icon 304B) provides modules to allow user of device 10 to generate email messages on device 10 and send them to their addressees. Application 222B also provides a GUI which provides a historical list of emails received, drafted, saved and sent.

Calendar 222C (which is associated with icon 304C) tracks appointments and other status matters relating to the user and device 10. It provides a daily/weekly/month electronic schedule of appointments, meetings and events as entered by the user. Calendar 222C tracks time and day data for device 10 using processor 202 and internal clock 220. The schedule contains data relating to the current availability of the user. For example it can indicate when the user is busy, not busy, available or not available. The application can also provide a "do not disturb" window of time for a user. Effectively, calendar 222C allows device 10 to be set to not notify the user when an interrupt event occurs, in spite of any lack of scheduled appointments during that window.

Address book 222D (which is associated with icon 304D) enables device 10 to store contact information for persons and organizations. In particular, name, address, telephone numbers, e-mail addresses, cell phone numbers and other contact information are stored in linked records. The data is stored in non-volatile memory, such as memory 216 in device 10 in a database. In use, the database is organized such that individual contact information can be accessed and cross referenced to other data in the same or other applications.

Location module 222E (which is associated with icon 304E) provides the current geographic location of device 10. In one embodiment, it receives and interprets remote GPS signals from a system of satellites to triangulate the current location of device 10, using, for example GPS modules and applications known in the art. On device 10, a GPS interface application controls the storage of GPS data retrieved by location module 222E. Alternatively, location information may be determined by analyzing encoded data relating to cellular telephone calls executed on device 10. For example, the encoded data stream can be examined to identify the current base station to which device 10 is communicating.

Movement detection module 222F receives data from movement module, converts and stores the data so that it may be processed by other modules. Further details on module 222F are provided below Gesture analysis module 222G receives movement data, as provided and processed by movement detection module 222F and then analyzes the movement data against representations of stored gestures. If a match is provided, then the gesture analysis module can activate a signal or process to execute a command associated with the recognized gesture. The command may relate to another application operating on device 10. Further details on module 222G is provided below.

Movement detection circuit 204, motion circuit 238 and trigger circuit 240 provide systems and devices to detection movements of device 10 and to set thresholds for detectable movements. Further details on these elements are provided below.

Communication functions, including data and voice communications, are performed through the communication sub-system 206 and the short-range communication sub-system 208. Collectively, sub-systems 206 and 208 provide the signal-level interface for all communication technologies processed by device 10. Various applications 222 provide the operational controls to further process and log the communications. Communication sub-system 206 includes receiver 224, transmitter 226 and one or more antennas, illustrated as receive antenna 228 and transmit antenna 230. In addition, communication sub-system 206 also includes processing module, such as digital signal processor (DSP) 232 and local oscillators (LOs) 234. The specific design and implementation of communication sub-system 206 is dependent upon the communication network in which device 10 is intended to operate. For example, communication sub-system 206 of device 10 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Other types of data and voice (telephonic) networks, both separate and integrated, may also be utilized with device 10. In any event, communication sub-system 206 provides device 10 with the capability of communicating with other devices using various communication technologies, including instant messaging (IM) systems, text messaging (TM) systems and short message service (SMS) systems.

In addition to processing communication signals, DSP 232 provides control of receiver 224 and transmitter 226. For example, gains applied to communication signals in receiver 224 and transmitter 226 may be adaptively controlled through automatic gain control algorithms implemented in DSP 232.

In a data communication mode, a received signal, such as a text message or web page download, is processed by the communication sub-system 206 and is provided as an input to microprocessor 202. The received signal is then further processed by microprocessor 202 which can then generate an output to display 14 or to an auxiliary I/O device 210. A device user may also compose data items, such as e-mail messages, using keypad 24, trackball 20 and/or some other auxiliary I/O device 210, such as a touchpad, a rocker switch, a separate thumbwheel or some other input device. The composed data items may then be transmitted over communication network 140 via communication sub-system 206. Sub-system 206 may also detect when it is out of communication range for its remote systems.

In a voice communication mode, overall operation of device 10 is substantially similar to the data communication mode, except that received signals are output to speaker 16, and signals for transmission are generated by microphone 28. Alternative voice or audio I/O sub-systems, such as a voice message recording sub-system, may also be implemented on device 10. In addition, display 14 may also be utilized in voice communication mode, for example, to display the identity of a calling party, the duration of a voice call, or other voice call related information.

Short-range communication sub-system 208 enables communication between device 10 and other proximate systems or devices, which need not necessarily be similar devices. For example, the short-range communication sub-system may include an infrared device and associated circuits and components, or a Bluetooth (trade-mark) communication module to provide for communication with similarly-enabled systems and devices.

Powering the entire electronics of the mobile handheld communication device is power source 236. Preferably, the power source 236 includes one or more batteries. More preferably, the power source 236 is a single battery pack, especially a rechargeable battery pack. A power switch (not shown) provides an "on/off" switch for device 10. Upon activation of the power switch an application 222 is initiated to turn on device 10. Upon deactivation of the power switch, an application 222 is initiated to turn off device 10. Power to device 10 may also be controlled by other devices and by software applications 222.

Now, further details are provided on features of an embodiment relating to detection of movements and analyzing such movements against representations of predetermined gestures to determine if a movement matches a gesture.

Figure 3:
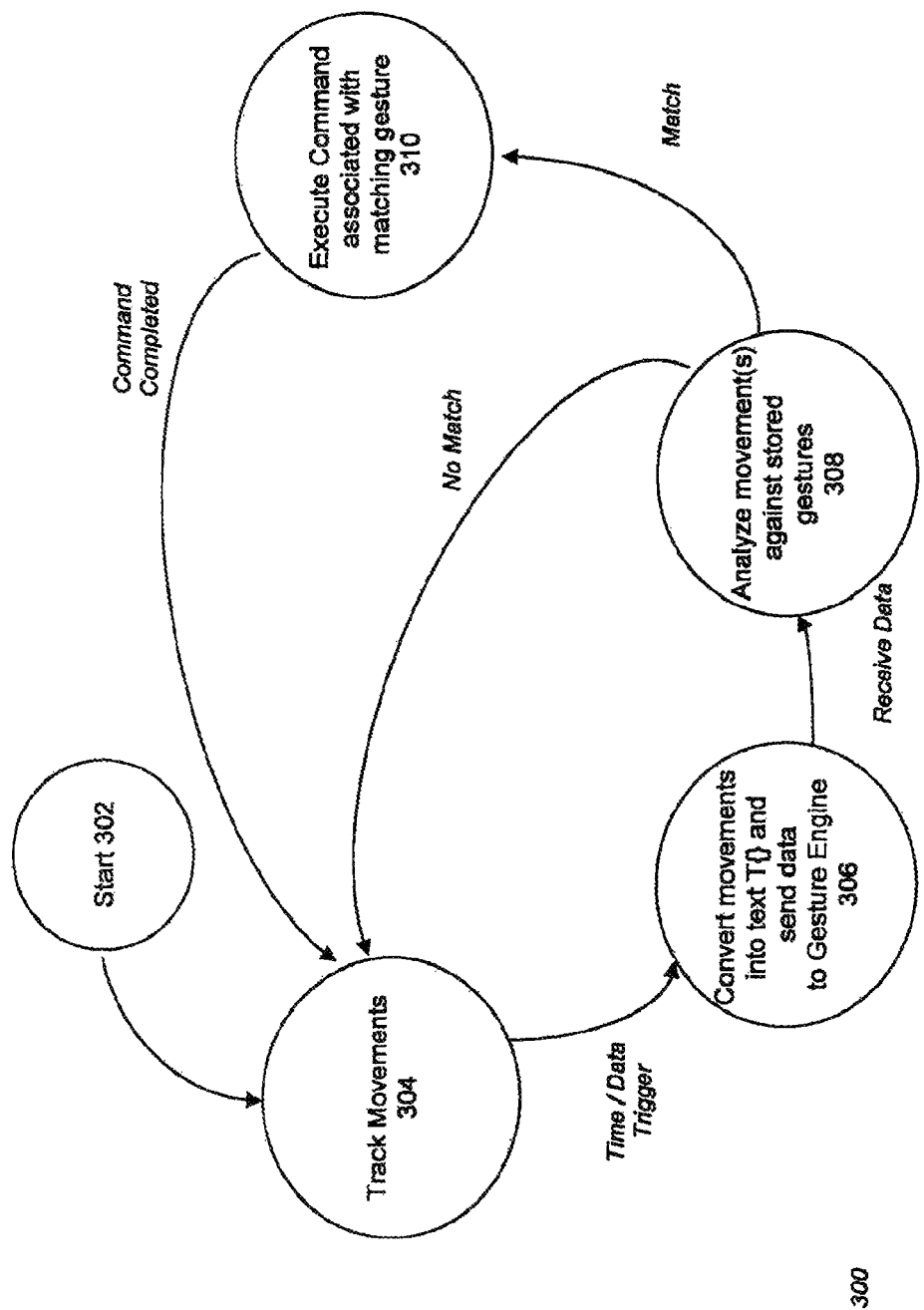
FIG. 3 is a state diagram of functions performed in processing movements of the device of FIG. 1.

Referring to FIG. 3, state diagram 300 provides an exemplary progression of activities, shown as states, that device 10 transits in, to and through as it receives movement data and processes it to determine whether a movement matches a stored representation of a gesture. In an embodiment, actions conducted in a state are executed by gesture analysis module 222G and/or other processes and modules operating on device 10. Movement data is provided by one or more of motion detection circuit 204, motion circuit 238 and trigger circuit 240.

The process begins at step 302, where device 10 is operating, which then progresses to state 304 where movements are tracked. As movements may occur at any time, this process may be operating as a background process in device 10. Movement detection module 222F monitors for, tracks and stores movement signals from one or more of motion detection circuit 204, motion circuit 238 and trigger circuit 240. At certain intervals (for example time, number of readings or predefined triggering events) the movement data is converted into a normalized format and then provided to gesture module 222G in state 306. Next at state 308, the frame of data is received and analyzed against representations of predetermined gestures. If there is a match of a movement against a gesture, then device 10 moves to state 310, where a command associated with the gesture is executed. The command may be for a specific application operating on device 10. A gesture may have different contexts for different applications or even at different instances within the same application. Once the command is completed, device 10 returns to state 304 to track more movements. If there is no match of a movement against a gesture, then device returns to state 304. Further detail on functions and processing conducted in state 308 is provided below.

As part of the movement data analysis, an embodiment use a coordinate model for tracking and mapping movements of device 10. Further details on exemplary models are provided below.

Newton's second law of physics dictates that changes in a velocity on an object produce a "proper" acceleration. Also, on Earth, the force of gravity is proportional to gravitational acceleration. Mathematically, acceleration is represented by a vector, i.e. a quantity comprised of both a magnitude and direction relative to a given coordinate system. Furthermore at any instant in time, the total acceleration acting on an object, such as device 10, is the vector sum of gravitational and proper acceleration.

Figure 4A:
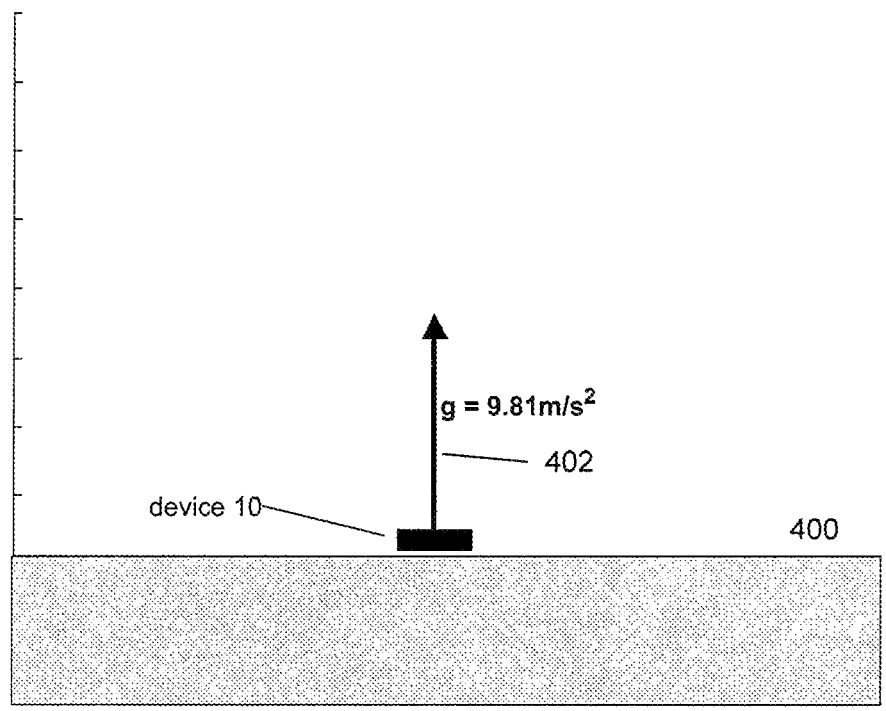
FIG. 4A is a schematic block diagram of an acceleration vector diagram representing acceleration due to gravity acting on the device of FIG. 1.
Figure 4B:
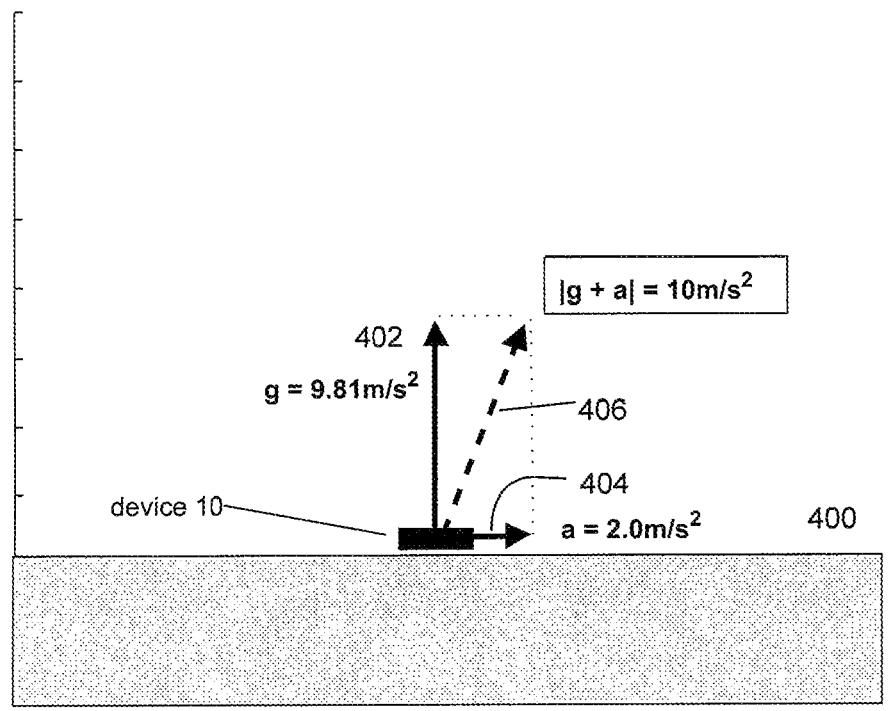
FIG. 4B is a schematic block diagram of an acceleration vector diagram representing a proper acceleration acting on the device of FIG. 1.
Figure 4C:
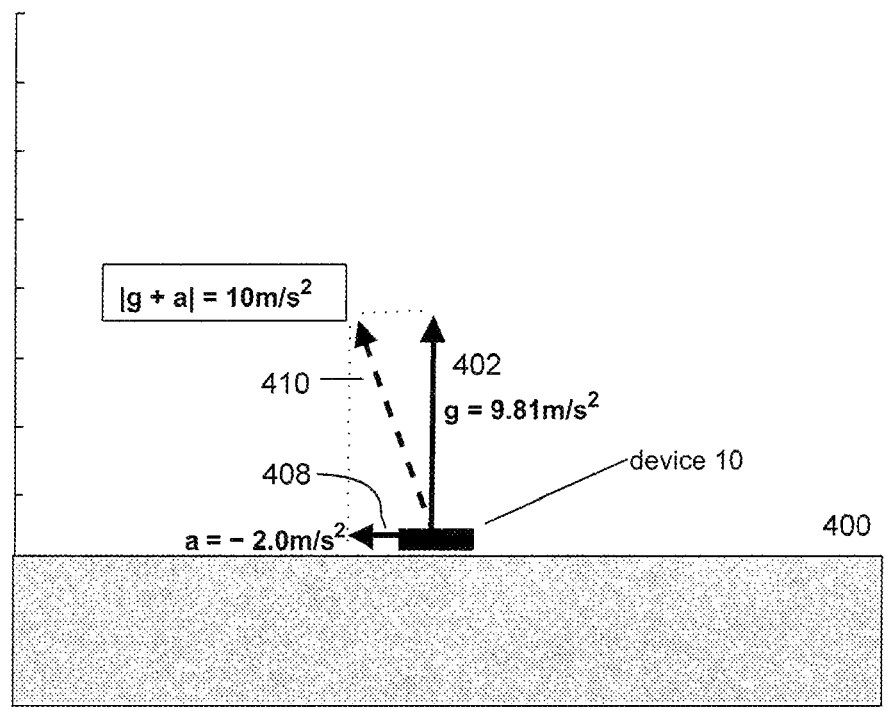
FIG. 4C is a schematic block diagram of an acceleration diagram vector representing gravity and a proper deceleration acting on the device of FIG. 1.

Referring to FIGS. 4A to 4C, the proper, gravitational, and total acceleration vectors acting on device 10 are shown at three snapshots in time. For the examples, the movements are mapped in the x-y plane. In this two-dimensional plane, vectors are denoted by bold face lower case letters and the magnitude in either regular type or enclosed in the absolute value symbols as in |v|. In FIG. 4A the gravitational acceleration g is shown as vector 402 acting alone on device 10, which is at rest in a fixed orientation on the Earth's surface 400. It is noted that gravitational acceleration points "up" from surface 400, which is the upward force resisting the gravitational pull to the center of the Earth. In FIG. 4B, device 10 has been imparted with a sidewise force (such as a movement by the user) and is accelerating at 2.0 m/s² to the right, as shown by vector 404, representing the proper acceleration resulting from the sidewise force. The net force acting on device 10 is shown by vector 406, which is the sum of proper acceleration of vector 404 and the gravitational acceleration of vector 402. is shown with magnitude |g+a|, where |g+a| is given by:

$$|g+a|=\sqrt{g^2+a^2}\; 10.0\text{ m/s}^2 \qquad \text{Equation 1}$$

$$\text{where } g^2=(9.81)^2=96.2 \qquad \text{Equation 2}$$

$$\text{and } a^2=(2.0)^2=4.0 \qquad \text{Equation 3}$$

(acceleration values are given up to 3 significant figures) Finally in FIG. 4C, device 10 is imparted with a sidewise force in an opposite direction of vector 404 and device 10 undergoes a deceleration (shown as vector 408) along the surface 402. The resulting vector 410 at this snapshot in time reflects the change in forces being applied to device 10.

Figure 5:
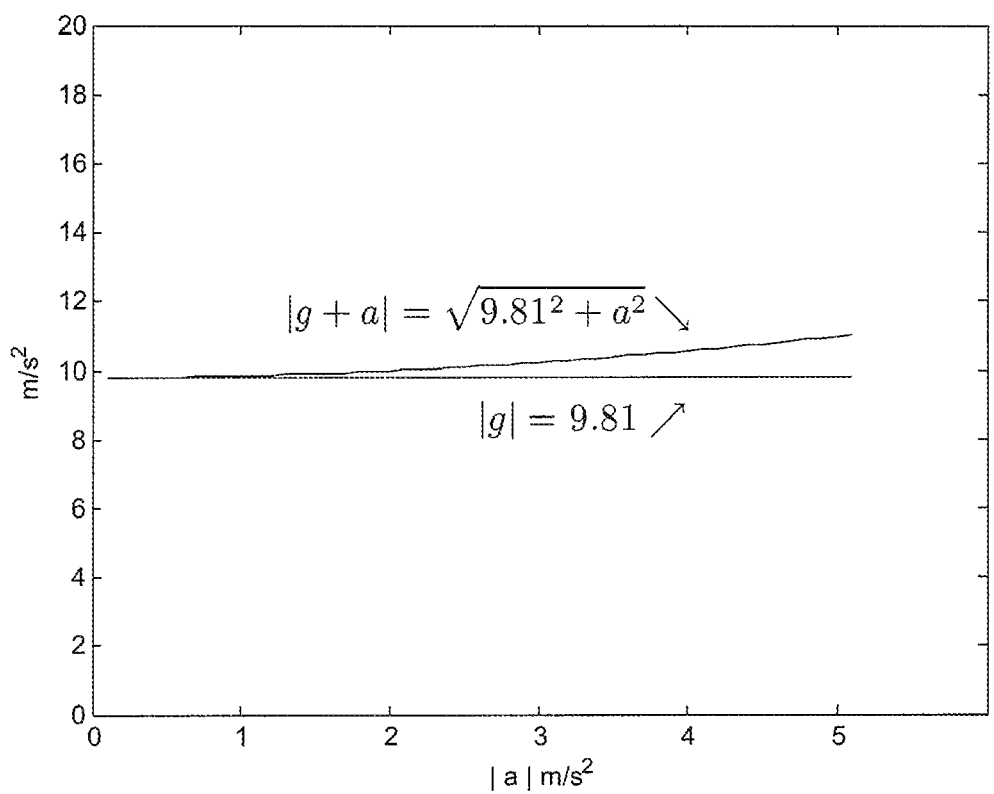
FIG. 5 is a plot of total acceleration with a plot of constant acceleration for a movement of the device of FIG. 1.

Referring to FIG. 5, it will be appreciated that a proper acceleration, depending on its magnitude and direction, may have minimal or marginal impact on the total acceleration experienced by device 10. For example, even a relatively swift rate of proper acceleration of +2.0 m/s² can have little effect on the magnitude of the total acceleration. As the magnitude of the total acceleration changes from 9.8 m/s² to 10.0 m/s², which is a difference of approximately 2%. The relative insensitivity of |g+a| to changes in |a| is shown in FIG. 4A, where Equation 1 is plotted for the indicated range of |a| values and compared to a |g| reference line. It is seen that:

$$|g+a|\cong|g| \text{ for } |a|<<|g| \qquad \text{Equation 4}$$

and that |g+a| deviates little more than 10% from |g| even when the proper acceleration |a| is about half the magnitude of gravitational acceleration.

Figure 6A:
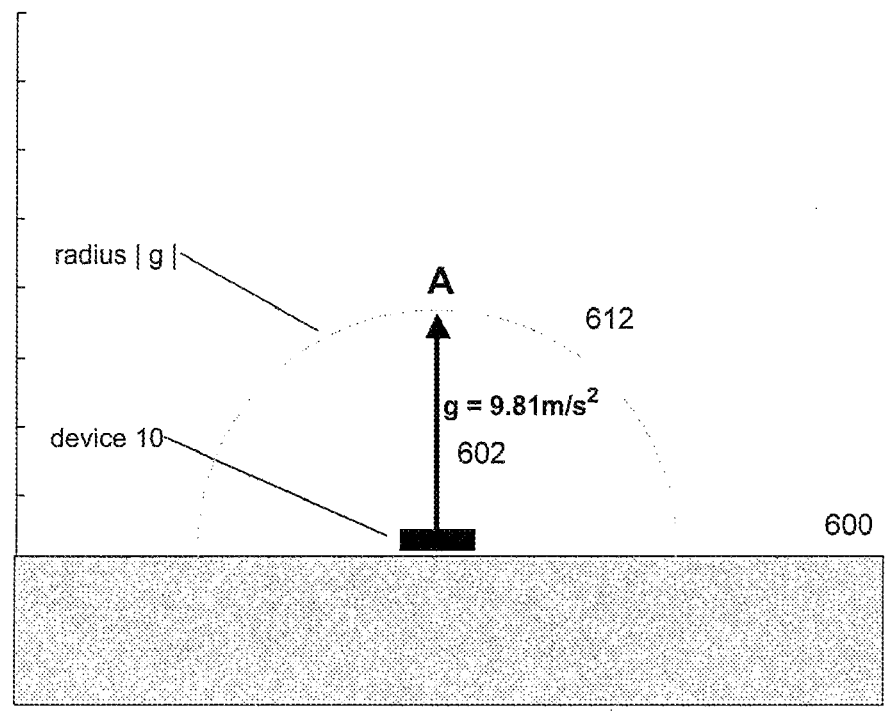
FIG. 6A is a schematic block diagram of the device of FIG. 1 having an acceleration vector diagram with a coordinate system added showing the gravity vector of FIG. 4A.
Figure 6B:
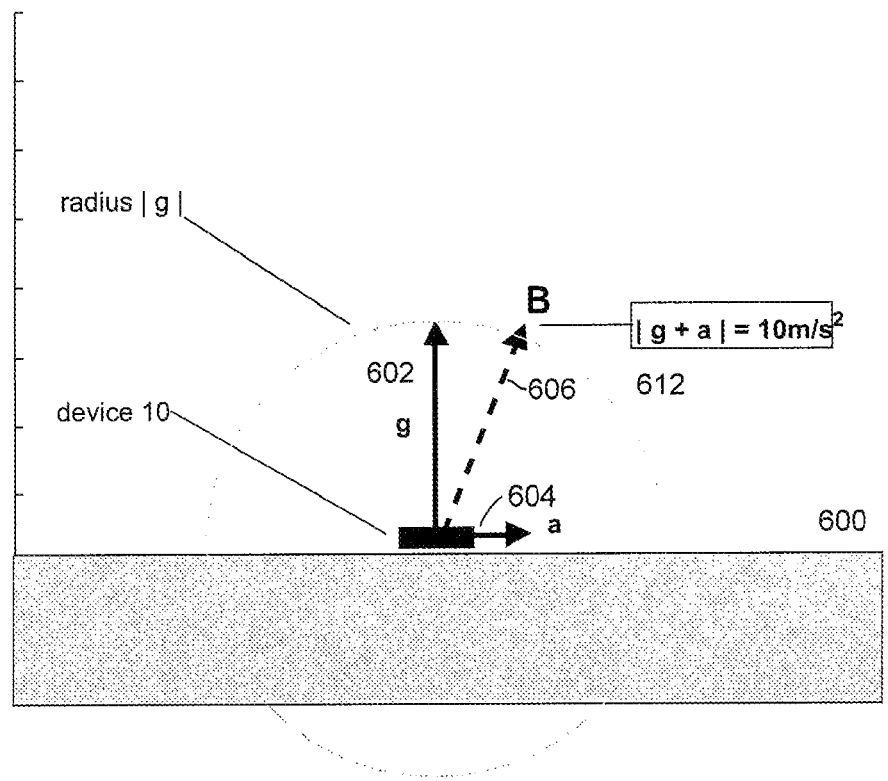
FIG. 6B is a schematic block diagram of the device of FIG. 1 having an acceleration vector diagram with the coordinate system of FIG. 4A added showing the acceleration vector of FIG. 4B.
Figure 6C:
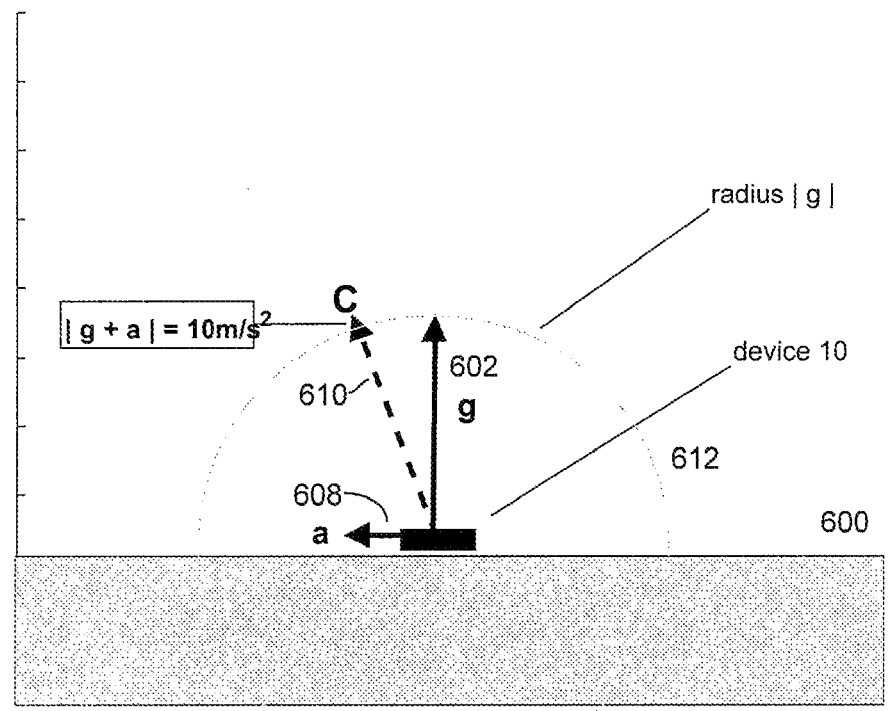
FIG. 6C is a schematic block diagram of the device of FIG. 1 having an acceleration vector diagram with the coordinate system of FIG. 4A added showing the deceleration vector of FIG. 4C.

FIGS. 6A to 6C show the three vector snapshots in time from FIGS. 4A to 4C adds a semi-circular shell 612 of radius |g| superimposed showing the approximate path of the total acceleration vector at a continuum of points for the movement described. The movement, in the three snapshots in time, are encoded, or mapped, in a discrete or 'quantized' fashion as the sequence of enumeration symbols shown as total acceleration vectors 602, 606 and 610 and are enumerated with the symbols "A, B, and C". Other vectors 604 and 608 are also shown.

To assist with cataloguing a sequence of movements of device 10, a sequence of enumeration symbols for a movement is provided. The sequence is referred to as a 'text string', T{m}. For example, a text sting that describes the motion from FIG. 6A to FIG. 6B to FIG. 6C is T{m}={A, B, C} (where m is the length of the string, here m=3). Predefined text strings are referred to as 'pattern strings' P{n}, where n is the associated length index for pattern strings. Also, the encoding process should map the total acceleration vector to the nearest enumeration symbol at the instant of the snapshot in time.

It will be appreciated that the described quantization scheme for linear motion may be changed to different degrees of precision by capturing more or less snapshots in time. Also, label for the positions of the total acceleration vector may use letters, integers, or any other convenient enumeration. Also, time and distance spacing of the enumeration symbols may be uniform or non-uniform depending on an embodiment.

To provide consistent cataloguing of movements for device 10, certain coordinate references should be fixed relative to device 10, including having a reference map, such as semi-circle 612 cartographically fixed to device 10 and having enumeration symbols fixed to predetermined locations on the reference map. Using an exemplary fixed coordinate system, an embodiment can track and map "proper" accelerations, as in FIGS. 6A to 6C, via the total acceleration vector (sum of proper and gravitational) by selecting different enumeration symbols as device 10 "properly" accelerates and/or decelerates without orientation change.

Now, further details are provided on the role of rotational movement and/or orientation changes on the quantization scheme used in models by an embodiment to track and map movements of device 10.

When enumeration symbols are fixed on semi-circle 612, and semi-circle 612 is fixed to the coordinates of device 10, then a quantization scheme for movements can be extended to include orientation changes of the device relative to the Earth.

Figure 7A:
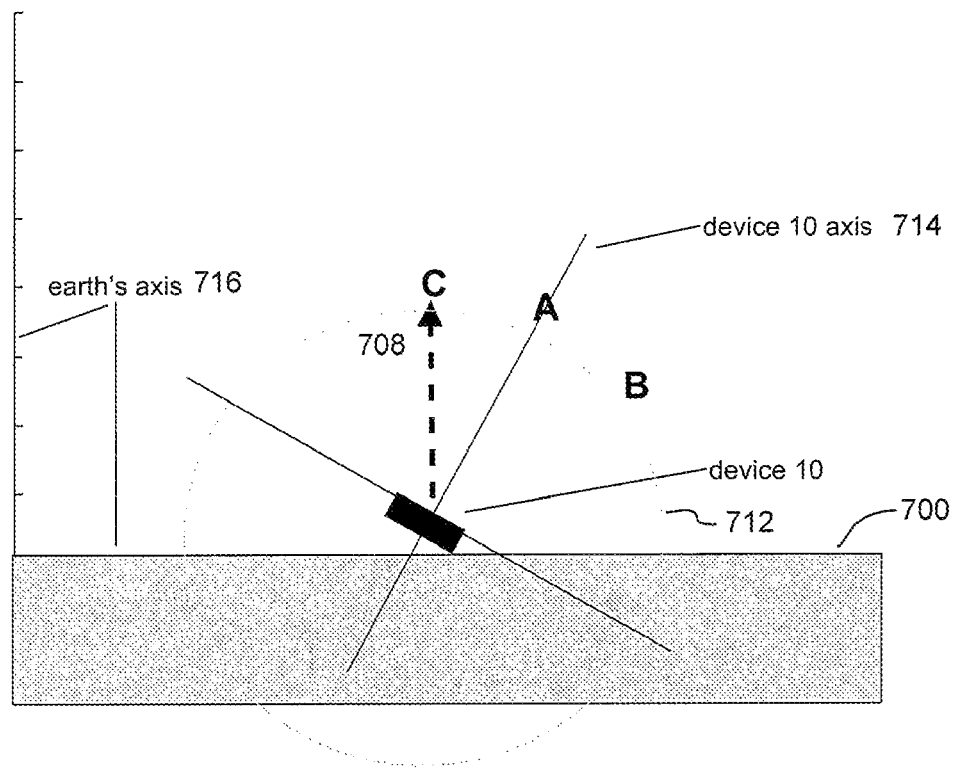
FIG. 7A is a schematic block diagram of the device of FIG. 1 having an acceleration vector diagram with a second coordinate system added showing the device in a first position tilted relative to the Earth's axis.
Figure 7B:
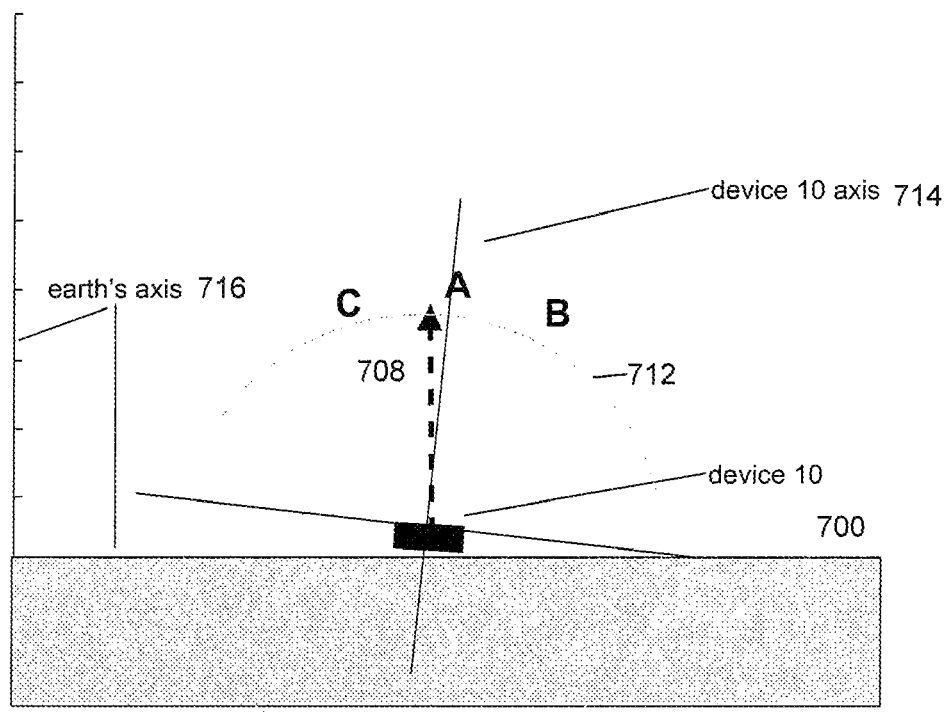
FIG. 7B is a schematic block diagram of the device of FIG. 1 having an acceleration vector diagram with the second coordinate system of FIG. 6A added showing the device in a second position tilted relative to the Earth's axis.
Figure 7C:
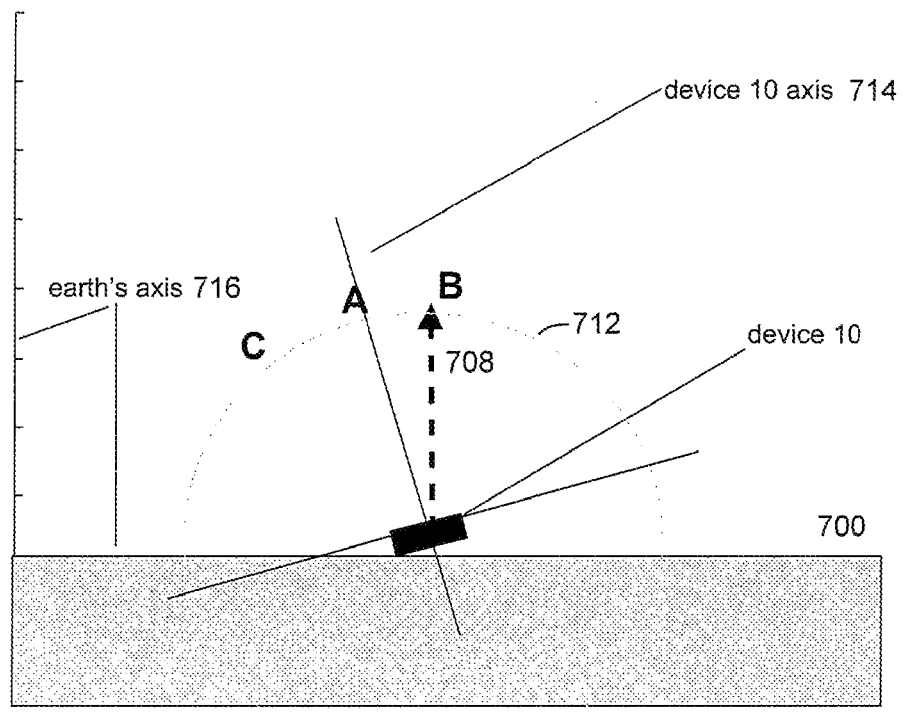
FIG. 7C is a schematic block diagram of the device of FIG. 1 having an acceleration vector diagram with the second coordinate system of FIG. 6A added showing the device in a third position tilted relative to the Earth's axis.

FIGS. 7A to 7C illustrate aspects of an exemplary tilting motion of device 10 encoded into the text string T{m}={C, A, B}. Referring first to FIG. 7A, axis 714 is provided representing the normal axis of device 10. Axis 714 is tilted a few degrees relative to the Earth's surface 700 and axis 716 so that the total acceleration vector 708 (which in the absence of any proper acceleration is the gravity vector alone) points to symbol "C" on circle 712. Next, in FIG. 7B, axis 714 has been rotated towards an almost flat position where the total acceleration vector points closest to symbol "A". Finally in FIG. 7C, the rotation of axis 714 has continued to point to "B". Thus the rotational motion is encoded in three snapshots in time as the text string T{m}={C, A, B}. As such, an embodiment can track and map purely rotational movement by having the gravity vector select different enumeration symbols as the reference axis 714 of device 10 rotates relative to gravity. As such, an embodiment can track and map a combination of rotational and proper accelerations via vector addition.

Further details are provided on an exemplary mapping scheme for three-dimensional movements of device 10 used by an embodiment. Application of an embodiment to a three-dimensional rotation involves extending the labelled locus of points on device 10 from a fixed two-dimensional scheme, such as semi-circle 612 of FIGS. 6A to 6C to a three-dimensional spatial scheme.

Referring to FIGS. 8A to 8D, in one three-dimension scheme, the two-dimensional motion shown in FIGS. 6A to 6C may be mapped as follows. First, a three-dimensional space is defined around device 10 on which the surface of the space is marked with a coordinate system. The coordinate system provides a locus of points from the origin for the device. The locus of points may have icosahedral symmetry. In one embodiment, spherical shell 812 is provided to define a space around device 10. Spherical shell 812 is a reference shell that is notionally fixed to device 10, as described in relation to FIGS. 7A to 7C. Shell 812 is an arrangement having regularly spaced points 818 on its surface. As will be described later, the arrangement of points 818 is a related and simplified version of other schemes, such as points 918 on shell 912 shown in FIG. 9A. In another embodiment a mapping may be provided as a five (5) frequency (V), or a 5V icosahedron shell. A 5V icosahedron shell has two hundred and fifty two (252) points on its surface. For clarity the labels for points 818A, 818B, and 818C are shown. The shell may be normalized to unit radius for convenience. Shell 812 may have icosahedral symmetry. Each point 818 is provided with a unique label (at least locally) on shell 812. Movements and gestures can be tracked as a component of the movement (per the total acceleration vector detected by device 10) go through one or more points, such as points 818 in the representation provided by shell 812 or certain points 918 provided on shell 912 in FIG. 9A, described below.

Figure 8A:
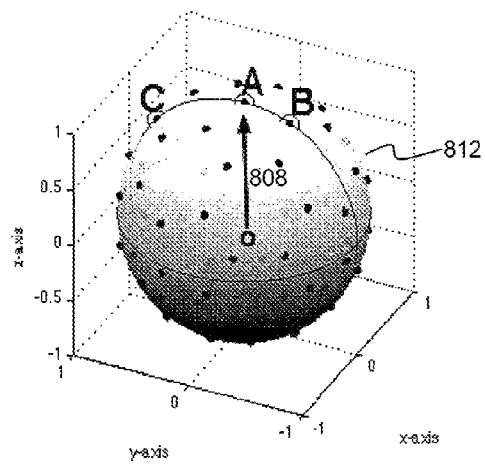
FIG. 8A-8D are block diagrams of three-dimensional realization of the motion in FIGS. 6A to 6C.
Figure 8B:
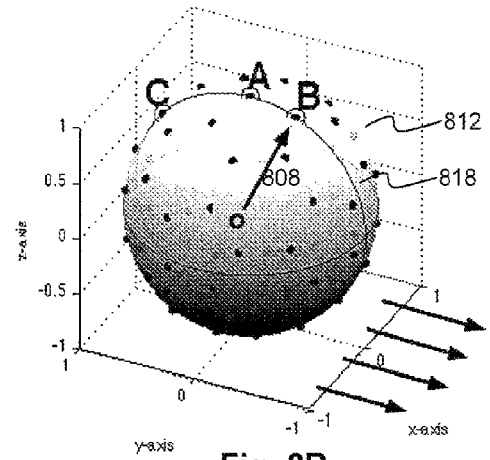
Figure 8C:
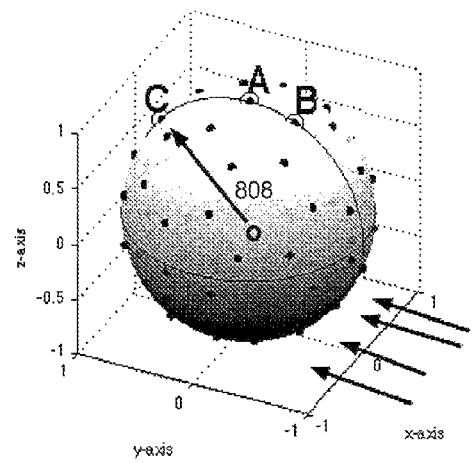
Figure 8D:
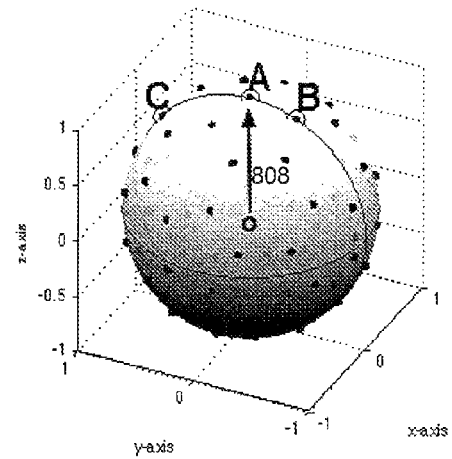

In FIGS. 8A to 8D, total acceleration vector 808 for device 10 emanates from the origin of shell 812, labelled "o", which is at the center of device 10. The total acceleration vector 808 can point to any position on the enclosing spherical shell 812. The overall movement in the four frames of FIG. 8A to 8D, in analogy to the two-dimensional movement of FIGS. 6A to 6C, is a proper acceleration followed by deceleration along a particular axis. In FIG. 8A, device 10 is motionless and the acceleration vector points vertically to point 818A; this is the three-dimensional analog to FIG. 6A. In FIG. 8B, device 10 is accelerating along an axis (indicated by the 4 arrows parallel to the axis) and the total acceleration vector 808 is the vector sum of gravity and proper acceleration, and is directed to point 818B; this is the three-dimensional analog to FIG. 6B. In FIG. 8C, a reverse acceleration results in the total acceleration vector 808 being directed to point 818C; this is the three-dimensional analog of FIG. 6C. In FIG. 8D, the motion has ceased and the total acceleration vector 808 is again at point 818A.

The movement in FIGS. 8A to 8D represented by the text string T{m}={A, B, C, A}, because the vertices labelled A, B, C, and A again were closest to data provided by the accelerometer in the four (sequential) snapshots in time.

The exemplary movement in FIG. 8A to 8D may be expanded to be generalized to include rotation of coordinates of device 10 with its proper acceleration. In other embodiments, other spherical covering schemes may be used employing greater or fewer numbers of vertices and different symmetries and/or arrangements of vertices. For example, the points formed by the intersection of a series of lines of longitude and latitude may be used. For any given covering scheme, for each motion, an embodiment provides a scheme to compute, identify, or select a vertex which is closest to each data point in a particular gesture from the data provided from the accelerometer. As such, a particular motion (i.e. a gesture) may be converted to a sequence of vertices which is represented by a text string through an embodiment.

The spacing and number vertices determine the precision of the mapping, i.e. the quantized gestures into strings by an algorithm in an embodiment. The more vertices and the closer the spacing between vertices, the more precisely a gesture may be mapped, but also resulting in longer text strings for a given motion.

With exemplary mapping schemes described, further detail is provided on exemplary sequence analysis used to recognize and discriminate among the string encoded gestures by an embodiment. Such a sequence analysis may be provided by gesture analysis module 222G and may be provided to implement state 308 of FIG. 3.

First, as a movement of device 10 is detected, parts of the movement are quantized into a text string. The text string is then analyzed against pattern strings of predefined gestures. When it is determined that a text string matches a pattern string, then a command associated with the pattern string can be executed. The determination of a match for a text string involves comparisons against thresholds. There may be an exact match of a pattern or a sufficiently similar match. When a match is identified (that meets a matching threshold criteria), then the gesture is deemed to be the matching gesture. It will be appreciated that there are gradients as to how to determine whether a detected string is sufficiently correlated to a patter string to consider the text string to match the pattern string.

Figure 9A:
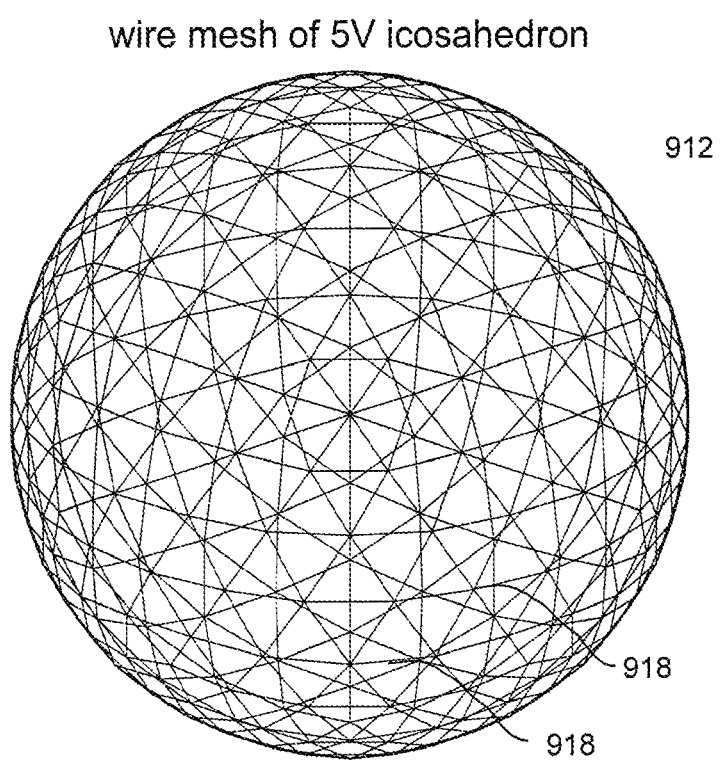
FIG. 9A is schematic block diagram of a coordinate model based on a five-frequency (5V) icosahedron used in an embodiment of the device of FIG. 1.

Referring to FIG. 9A, further detail is now provided on text string processing by an embodiment. When movements of device 10 are detected by one or more of motion detection circuit 204, motion circuit 238 and trigger circuit 240, the movement data is processed and converted into a stream of "text", where each element in the text represents a location on sphere 912 at a snapshot in time, and the sequence of elements represents the sequence of locations on the sphere at the given instants in time. The string T{m} provides a representation of the movement. The basic movement data detected by one or more of motion detection circuit 204, motion circuit 238 and trigger circuit 240 may be mathematically translated into movement vectors and then mapped against a stored digital representation of sphere 912 with its points 918 to determine when a movement (or part of a movement) has crossed a point 918 and therefore indicating that that movement should be added to the T{m} string.

As the T{m} string is built for device 10 moves, it may be compared against a stored gesture signature encoded as a pattern string P{n}. An embodiment analyzes the movement against the gesture and provides a degree of deviation for the movement in its T{m} string when comparing its values against the gesture signature as captured in the pattern string P{n}. For example, for a gesture having a signature P{n}={A, B, C, D, E, F}, an exemplary movement T{m}={A, B, C, F, E, F} (having a "small" deviation from the exemplary as manifest by the "F" symbol in the fourth position) may considered to be an acceptable match for the gesture, but a second exemplary movement T{m}={A, B, C, F, A, F} (having a determined "significant" deviation from the exemplary as manifest by the "F, A" sequence in the fourth and fifth positions) may not be an acceptable match. It will be appreciated that a deviation may occur at a location in the movement. At the location the deviation may have different values. There may be more than one deviation in the movement. Each of the deviations may have "significant" and/or "insignificant" tolerances, depending on acceptable ranges for the movement. Such acceptable ranges are provided in a substitution matrix, described below.

It will be appreciated that one or more deviations (of different sizes) at different points in the gesture may be considered to be "small" or "significant" deviations (or not). Such are thresholds that may be set according to any number of paradigms, including for example through quantitative measurement of gestures and statistical analysis of a preset number of gestures. An algorithm described below provides one threshold to determine when a deviation is deemed to be "significant" and as such, outside of an acceptable measurement parameter for a gesture. Where durations exist in the string may be a factor, as well as the size of the deviation.

To execute such analysis, device 10 according to an embodiment has modules, algorithms, methods, steps and processes to attempt to identify segments of a T{m} string that are "sufficiently" similar to the P string for a gesture.

An embodiment uses local sequence alignment analysis to examine and emphasize an overall similarity between an input string and a target string. Local sequence analysis is related to edit distance analysis, but in an embodiment can find a longest sequence (or sufficiently long sequence) of similarity between two input strings and compute a normalized score, whereas edit distance may favour shorter matches to satisfy its cost-based algorithm. A Levenshtein edit distance analysis is one type of analysis. A Smith-Waterman analysis is another type.

A local sequence alignment analysis is dependent on three variables. First is the gap penalty Γ; second is the substitution matrix $S(x_i, y_j)$; and third is the adjacency matrix A(i,j) Each is discussed in turn.

A gap penalty Γ provides flexibility to an alignment by allowing empty spaces to be strategically inserted in T{m} or P{n} if such insertions maximize the overall alignment score between T{m} and P{n}. The penalty associated with Γ is to constrain excessive insertion of gaps. The exact mathematical use of Γ in the alignment algorithm will be seen below. The substitution matrix is mathematically derived directly from the adjacency matrix:

$$S(i,j)=2I(i,j)-E(i,j)-2A(i,j)$$ Equation 5 where I is an identity matrix, and E is a matrix of all 1's.

Figure 9B:
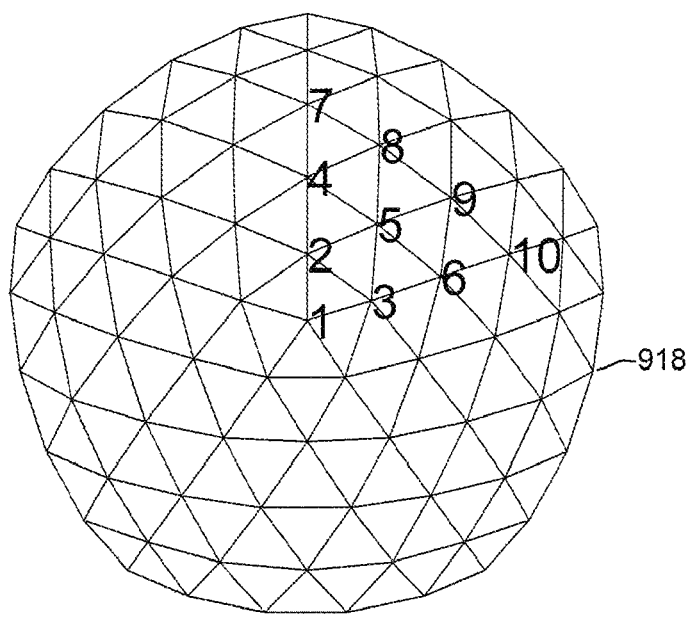
FIG. 9B is a section of the icosahedron having a numbering scheme showing ten vertices of FIG. 9A.

The substitution matrix used by an algorithm is based on geometrical relationships between the vertices of the spherical covering, which is expressed as an adjacency matrix A(i, j). Referring to FIG. 9A and FIG. 9B, a numbering plan for a particular spherical covering of icosahedral symmetry, the 5V icosahedron 912, is shown for ten vertices. Each vertex 918 is identified with a "-#" suffix. As such, the fifth vertex is identified as vertex 918-5. For convenience, the reference number 918 may be dropped. Vertex 918-5 is seen to be adjacent to vertices 918-2, -3, -4, -6, -8, and -9. Mathematically, one embodiment defines this topology in the form of a sparse adjacency matrix such that the $m^{th}$ row defines the adjacencies of vertex 'm' where zero (0) means not adjacent and one (1) for adjacent. As such, for vertex m=5, A(5,2)=A(5,3)=A(5,4)=A(5,6)=A(5,8)=A(5,9)=1, and all other elements along the fifth row are zero, i.e. A(5,m)=0.

Figure 9C:
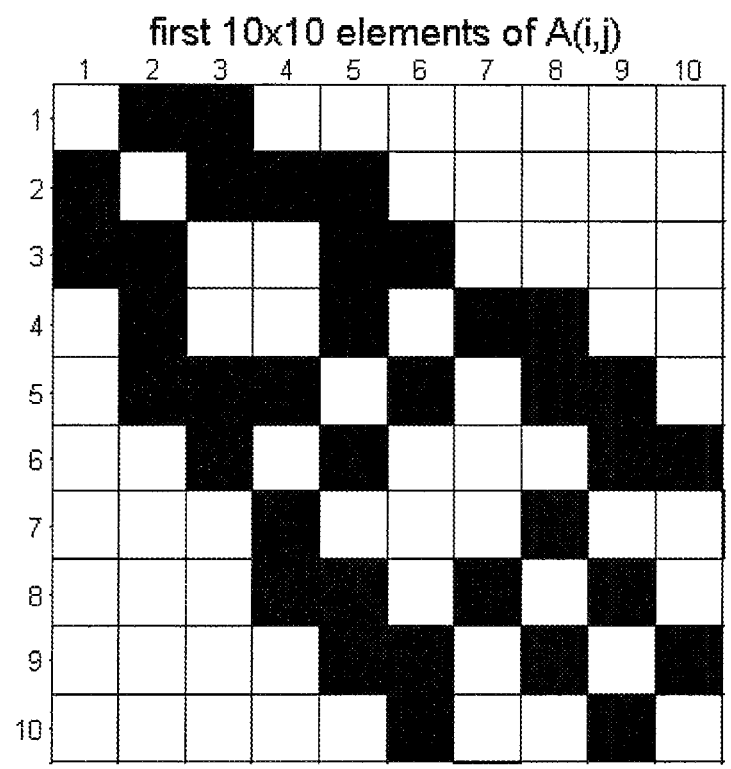
FIG. 9C is a graphical representation of a snapshot of elements of an adjacency matrix corresponding to the 5V icosahedron of FIG. 9A.
Figure 9D:
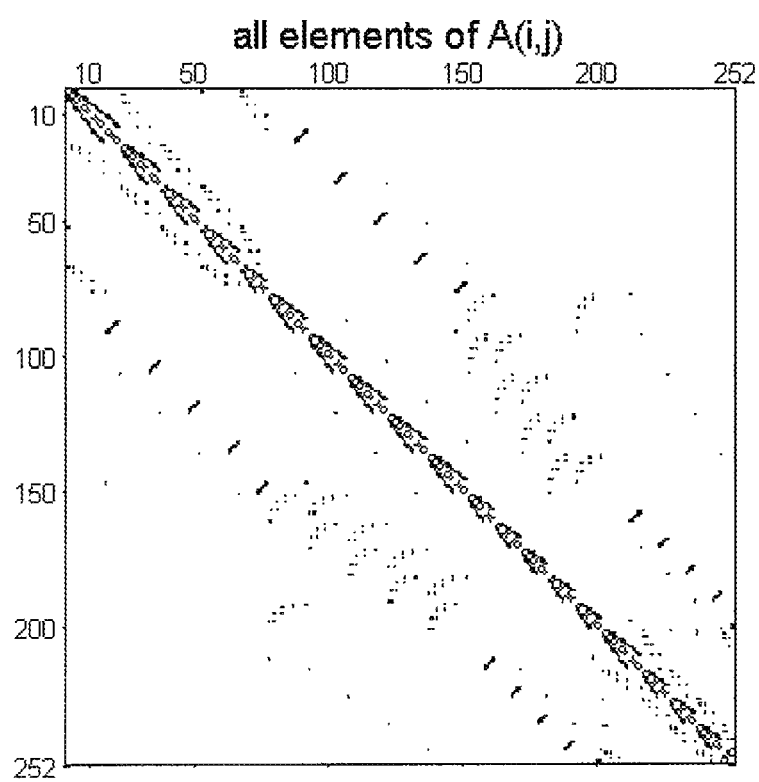
FIG. 9D is a block diagram of a full adjacency matrix corresponding to coordinate model of FIG. 9A.

FIG. 9C provides a matrix of the first 10×10 elements of A(i,j), where the white squares such as A(1,4) indicate that there is no adjacency between vertex 1 and 4, and black squares such as A(1,3) indicate that vertices are adjacent to each other. The entire 252×252 array (associated with the 5V icosahedron) is shown in FIG. 9D. The adjacency matrix forms a basis for the substitution matrix, discussed next.

One use of the substitution matrix $S(x_i, y_j)$ is to provide robustness to the gesture detection algorithm. It does so by providing information on what characters in T{m} may be substituted (within threshold parameters) for another character to achieve a higher matching score with a P{n}. In other words, the substitution matrix can identify motions in T{m} that are sufficiently similar to motions encoded and stored in the gesture signature encoded by the pattern string P{n}.

For this disclosure, direct adjacency as described above is referred to as a "first order" adjacency, as only those vertices which are direct neighbours may be substituted in a string matching algorithm. In an embodiment, the first order adjacency may be extended. In one extension, the adjacency is extended to second, third, and up to $N^{th}$ order, where vertices which are next-to-adjacent, next-to-next-adjacent, and up to N times-adjacent, respectively are substituted without penalty. In a variant extension, the substitution of higher-order adjacency terms may include a penalty proportional (or some other function) to the distance, or order, the substitution candidate vertex is from the matching point in the gesture signature encoded in the pattern string P{n}.

Higher order substitution matrices $S(x_i,y_j)$ may be obtained from higher powers of A(i,j) in equations similar to Equation 5. It is notable $A^N(i,j)$ will converge for some finite value of N to the matrix of all 1's E(i,j). Physically, that value of N is the maximum number of steps a given vertex can be from any other vertex. Given this physical interpretation, an algorithm or process may use N to provide break condition limits on certain indeterminate evaluation loops, thus adding robustness to algorithm. Convergence of $A^N(i,j)$ is due to its relation to a Markov transition matrix.

As noted, a gap penalty Γ provides flexibility to an alignment strategy by allowing empty spaces to be strategically inserted if such insertions maximize the overall alignment score. A linear gap penalty reduces the overall score match in proportion to the number of gaps inserted, but alternative gap penalties per sequence analysis paradigms may be utilized.

In one embodiment, local sequence alignment is evaluated through a recursive process. Local sequence alignment may be part of an evaluation conducted in state 308 of FIG. 3. Therein, two strings T{m} and P{n}, a substitution matrix with entries $S(x_i,y_j)$ and a linear gap penalty Γ are provided. A dynamic programming matrix D(i,j) may be computed providing a measure of alignment between T{m} and P{n}. The matrix D(i,j) may be defined recursively as described below.

Referring to FIG. 10A, further detail is provided on an algorithm to compare a text string to a pattern string. In order to provide tracking of historical data of a text string, it has been found that the Smith-Waterman algorithm may be modified to and used to build a matrix of movement data T{m} and gesture data P{n}. The Smith-Waterman algorithm produces an alignment score between T{m} to P{n}, defined as the maximum value in the dynamic programming matrix D(i,j). The alignment score may be quoted as an alignment percentage, i.e. a percentage of the maximum possible alignment where T{m} is identical to P{n}.

In one embodiment, device 10 produces data relating to detected movements of device 10 at a predefined, regular rate. This data is used to build text strings T{m}. In the modified algorithm, detected strings T{m} and P{n} are entered in the left side and top respectively in matrix D(i,j), where m and n are the lengths of T and P respectively. In one implementation for an embodiment the T{m} and P{n} strings are expressed with base 16 integer enumeration symbols. The leftmost column and top row of D(i,j) are initialized respectively as follows:

$$D(i,0)=0, i=0 \ldots m$$

$$D(0,j)=0, j=0 \ldots n$$

The remaining matrix elements are computed recursively, where entries in D(i,j) are computed through a recursive formula that fills out the current row, left to right, by using values the previous row and/or columns, and as modified by values of the $S(x_i,y_j)$ or the gap penalty Γ. Entries for D(i,j) are set to be the minimum value of 0 or one of three surrounding entries as follows:

$$D(i, j) = \max\{0 [\text{or}] D(i-1, j) + \Gamma [\text{or}] D(i, j-1) + \Gamma [\text{or}] D(i-1, j-1) + S(x_i, y_j)\} \quad \text{Equation 6}$$

For $i = 1 \ldots m, j = 1 \ldots n$

An exemplary D(i,j) is shown in FIG. 10A, where the enumeration symbols in T{m} and P{n} are base 16 integers and:

$$\Gamma = -½; \quad \text{Equation 7}$$

$$T\{m\}=\{A2,FF,C7,C0,C2,A2,C2,BF,FF\}; \quad \text{Equation 8}$$

$$P\{n\}=\{BF,C0,C2,C4,C7\}; \quad \text{Equation 9}$$

and $S(x_i,y_j)$ is as defined in FIG. 10C.

Referring to FIG. 10A, the maximum value found in D(i,j) is 4.5, therefore by definition the alignment score is 4.5. Given the $S(x_i,y_j)$ where each alignment adds 1 to the alignment score, the maximum ("best") possible alignment with P{n=5} would produce a score of 5, where received symbol in the text string is an exact match to the corresponding five elements in the pattern string. As such, an alignment score of 4.5 provides 90% alignment (4.5/5) with an exact match. It is understood that the alignment score may be a function of Γ and of $S(x_i,y_j)$. Such values may be carefully selected in view of particular real-time contexts for an embodiment. The threshold for the alignment score may be set to be any suitable value for an implementation. The threshold value may change during operation of an embodiment.

An embodiment analyzes the movement T{m} against the gesture signature P{n} and provides a degree of deviation of the movement T{m} against the gesture signature as captured in the pattern string P{n}. In the exemplary case given above in Equations 7 to 9, and the $S(x_i,y_j)$ defined in FIG. 10C, the alignment score of 4.5 corresponds to a deviation of 10%. Deviation and alignment are related by: % Deviation= (100−% Alignment).

It is appreciated from inspection of Equation 6 that it is only necessary to keep the current and previous rows of the D(i,j) matrix in memory at any point in the computation because the embodiment only requires the final score of the alignment. This provides an efficient use of computational resources. Therefore the memory required is capped at 2×n integers. It will be appreciated that the n×m traceback matrix used in standard implementations of the Smith-Waterman, is not needed for an embodiment as details of the physical alignment information is not required to obtain the simple alignment score. Again, the memory is capped at 2×n for this movement.

It will be appreciated that multiple gestures may be analyzed against a movement in one pass of an analysis of a dynamic programming matrix. Further detail on such an analysis is provided below.

Periodically, a frame of data length L is provided to the movement detection module 222F where each data in the frame is sequentially converted to an enumeration symbol. The symbol may be appended to T only if it is different from the previous symbol. It is understood therefore that the length of the final text string T may therefore be shorter than L, the data frame length, i.e. m≤L.

Contiguously repeating symbols in each frame may be identified in movement module 222F and discarded from the text string. Repeating symbols merely indicate the preelected chosen acceleration data sampling rate is faster than the rate of motion for an embodiment. Discarding repeated symbols improves robustness of the algorithm by reducing the dependency on the speed at which gestures are executed. Discarding contiguously repeated symbols also reduces computational overhead, especially in periods of motionlessness, or near motionlessness, where length of the text strings may approach zero for as long as the motionless or near motionlessness persists. Discarding contiguously repeated symbols also reduces the length of the text string. The string is now of length 'm' which is less than or equal to the length of the data frame L, i.e. m≤L. Benefits of reducing the string length include reducing the size of the dynamic programming matrix $D(i,j)$, the number of calculations performed on it, and the memory required for those calculations in the gesture analysis module 222G.

Further details are provided on the analysis of a gesture signature $P\{n\}$ straddling two text strings $T_1\{m'\}$ and $T_2\{m''\}$.

The standard application of the Smith-Waterman algorithm zeros out the top row of the $D(i,j)$ matrix, and in doing so all previous alignment data is jettisoned. However, an embodiment provides retention of previous alignment data between searches. Therein, two movement text strings $T_1\{m'\}$ and $T_2\{m''\}$ may be processed together such that alignment information gained in $T_1\{m'\}$ is carried into an alignment evaluation of $T_2\{m''|\}$ Such retention is useful when a detected gesture straddles two consecutive text strings $T_1\{m'\}$ and $T_2\{m''\}$. Retention of such alignment data avoids having to reset the alignment state after processing $T_1\{m'\}$ when the analysis of $T_2\{m''\}$ commences, as would be the case in prior art Smith-Waterman analysis techniques.

When a gesture straddles two sequential text strings, an embodiment can still identify the gesture. This is demonstrated by breaking the exemplary string from Equation 8 into two segments $T_1\{m'\}$ and $T_2\{m''\}$, namely:

$$T\{m\} = T_1\{m'\} \oplus T_2\{m''\}; \qquad \text{Equation 10}$$

where: ⊕ is a string concatenation operator.
The index convention is m=m'+m'', where m'=4; m''=5, and where:

$$T_1\{m'\} = \{A2, FF, C7, C0\}; \qquad \text{Equation 11}$$

$$T_2\{m'\} = \{C2, A2, C2, BF, FF\}; \qquad \text{Equation 12}$$

and where $P\{n\}$ and $\Gamma$ are defined in Equations 9 and 7 respectively. Substitution matrix $S(x_i, y_j)$ remains as defined in FIG. 10C. The dynamic programming matrices of $T_1\{m'\}$ and $T_2\{m''\}$ are denoted $D_1(i,j)$ and $D_2(i,j)$ respectively.

In the embodiment, the largest matrix element found in the pair $D_1(i,j)$ and $D_2(i,j)$ is identical to the largest matrix element found in the concatenated matrix $D(i,j)$, which is a modification from the known the Smith-Waterman algorithm. The embodiment processes the matrix by simply initializing the top row of $D_2(i,j)$ by the last row $D_1(i,j)$, i.e. by having:

$$D_2(i=0, j) = D_1(m=\text{last}, j) \text{ for } j=0 \ldots n \qquad \text{Equation 13}$$

As such, it can be see that an embodiment provides a time-domain component to processing text strings, which expand upon features of the Smith-Waterman algorithm.

Further details of the embodiment are provided through processing of an exemplary case.

In an example, an embodiment constructs two matrices $D_1(i,j)$ and $D_2(i,j)$ by placing $T_1\{m'\}$ and $T_2\{m''\}$ along the sides of each matrix respectively and placing $P\{n\}$ along the top of both and computing the elements according to Equation 6. Using the values of $P\{n\}$, F, and $S(x_i, y_j)$ as before, an embodiment builds $D_1(i,j)$ and $D_2(i,j)$ as shown in FIG. 10B. It can be seen that the same maximum value (i.e. alignment score, indicated in figure) is computed for the pair $D_1(i,j)$ and $D_2(i,j)$ than as the single $D(i,j)$ matrix shown in FIG. 10A.

It will be appreciated that a continuous selection of text string pairs can be processed in the fashion described above to ensure that the alignment score is built, over time, and continuously, until such time as a threshold is met and the gesture analysis module activates a signal or process to execute a command associated with the recognised gesture. Only at such time is the alignment score reset. The algorithm may be applied to string 1 and string 2, then to string 2 and string 3, and so on. As such, alignment data in string 1 propagates to string 2, string 3 and so on without temporal interruption.

It will be appreciated that in other embodiments, multiple alignment scores may be provided simultaneously for each data frame string $T\{m\}$, where efficiencies for simultaneous gesture detections may be provided by extending the number of columns of $D(i,j)$ to encompass all desired gesture signatures $P\{ \}$.

Referring to FIG. 10D, a $D(i,j)$ matrix is constructed with data frame string $T\{m\}$ on the left and two gesture signatures $P1\{n\}$ and $P2\{n'\}$ along the top. A column of zeroes is inserted between the gesture signatures to provide correct results. It is seen that the maximum alignment for $P1\{n\}$ is 4.5 with corresponding alignment percentage of 90% (4.5/5) while the alignment percentage of $P2\{n'\}$ is 100% (6/6), therefore $P2\{n\}$ would be selected as the matching pattern. It will be appreciated that the $D(i,j)$ matrix may be extended in similar fashion to provide processing of as many gesture signatures as an embodiment requires.

Figure 11:
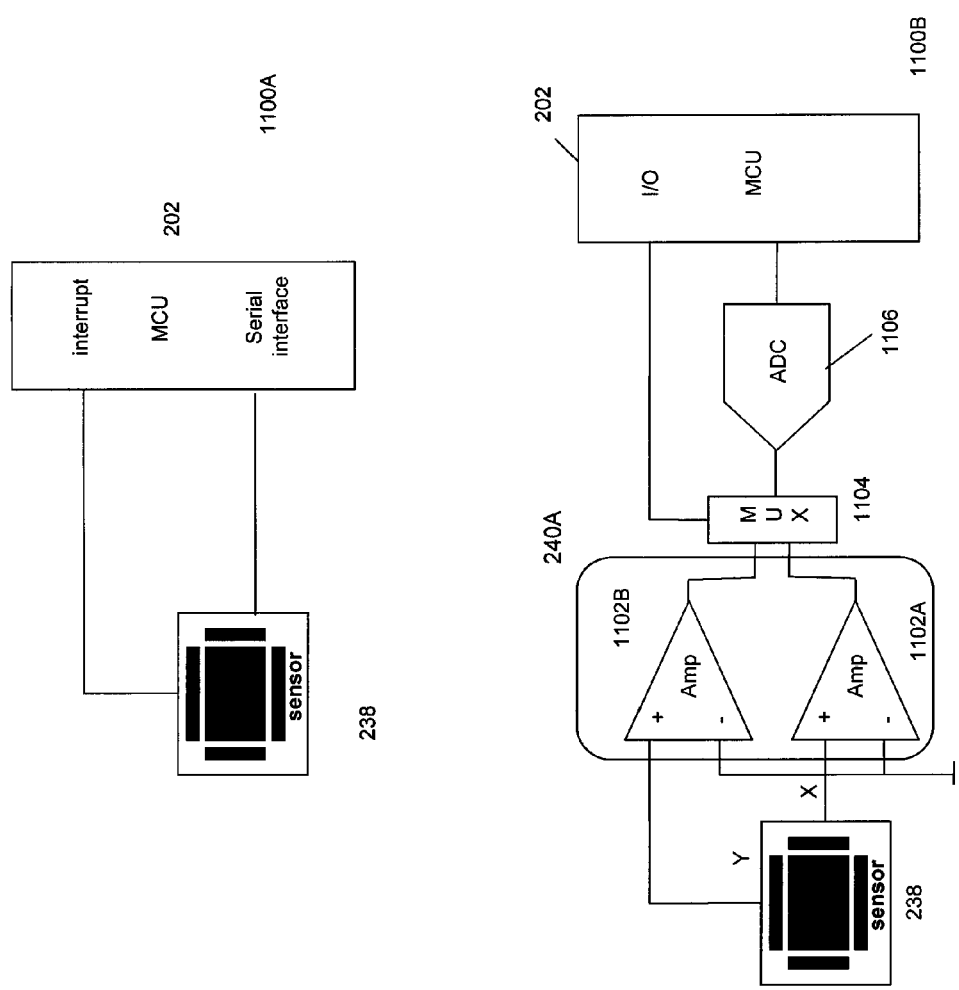
FIG. 11 is a block diagram of two movement detection systems of the embodiment of FIG. 1.

Referring to FIG. 11, with some algorithms of an embodiment described, further detail is provided on how aspects of the embodiment are implemented in device 10 through movement detection module 204 and its related components. Therein, two sensors arrangements for device 10 are shown. Circuit 1100A shows sensor 238 directly connected to the interrupt and serial interface input lines of microprocessor 202. Accordingly, software operating on microprocessor 202 is provided to selectively monitor signal(s) from sensor 238 to determine whether a notable movement of device 10 has been detected. The circuit between sensor 238 and microprocessor 202 can be considered to be one version of circuit 240. Software operating on microprocessor 202 determines when a notable signal has been generated by sensor 238. Circuit 1100B shows sensor 238 connected to trigger circuit 240A having two differential comparators 1102A and 1102B, which then have their outputs attached to an analog mux 704. The mux selectively provides its output according to a control signal generated by microprocessor 202. The analog output of mux 1104 is converted to a set of digital signals by analog to digital converter 1106, which then provides the output to microprocessor 202. As with other implementation, software operating on microprocessor 202 determines when a notable signal has been generated by sensor 238. Reading of positions determined by the software can be stored in memory 218 or 216. The software can also create an average reading of the movement readings. This average reading can be used to determine when device 10 is in a resting position or when it is effectively in a resting position (e.g. it is being moved only in inconsequential amounts).

For any embodiment, a low-g MEMS (micro-electromechanical system) accelerometer may be used for motion sensor 238. Further, the accelerometer may be of almost any type, including a capacitive, piezoelectric, piezoresistive, or a gas-based accelerometer. An exemplary low-g MEM accelerometer is a LIS302DL tri-axis digital accelerometer, available from STMicroelectronics of Geneva, Switzerland. Accelerometers sense and convert an acceleration detected from a motion (e.g. tilt, inertial, or vibration) or gravity into an electrical signal (producing a corresponding change in output) and are available in one, two or three axis configurations. Accelerometers may produce digital or analog output signals.

To improve sensitivities of an accelerometer when it is used as motion sensor 238, its outputs can be calibrated to compensate for individual axis offset and sensitivity variations. Calibrations can also be performed at the system level, providing end-to-end calibration. Calibrations can also be performed by collecting a large set of measurements with the device in different orientations.

Figure 12:
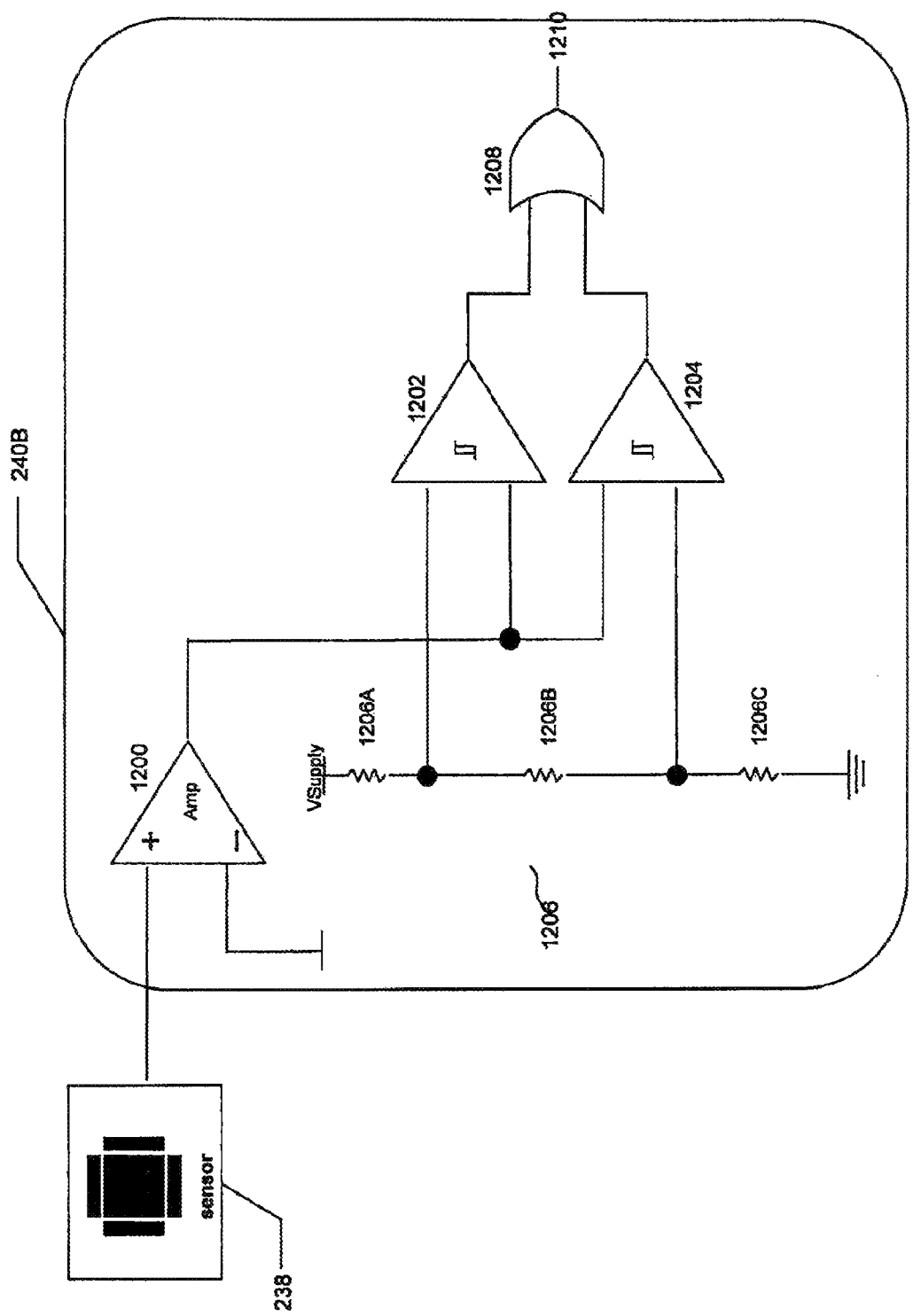
FIG. 12 is a block diagram of an alternative movement detection system the embodiment of FIG. 1.

Referring to FIG. 12, an alternative circuit 240B is shown for sensor 238 which is aligned as a single axis analog sensor. Sensor 238 can be oriented such that its output detects movement along a desired axis (e.g. 'Z' axis detecting when device moved vertically). Additional axes may be monitored by replicating circuit 240B for each additional axis. Briefly, the output of sensor 238 is provided to buffer amp 1200. The output of buffer amp 1200 is provided in tandem to comparators 1202 and 1204. The other inputs of comparators 1202 and 1204 are taken from different taps on resistor ladder 1206, comprising resistors 1206A, 1206B and 1206C. Comparators 1202 and 1204 each produce upper and lower limit comparison signals for the output of sensor 238. If the value of the signal from sensor 238 is either above the upper limit set by the parameters of comparator 1302 (comparing the signal from sensor 238 against its tap from the resistor ladder 1206) or below the lower limit set by the parameters of comparator 1204 (comparing the signal from sensor 238 against its tap from the resistor ladder 1206) then OR gate 1208 generates a trigger signal 1210. It will be appreciated that the limits can be used to define a range of signals detected by sensor 238 representing when be device 10 is either stationary (e.g. at rest) or being moved.

It will be appreciated that other circuits using different combinations of sensors and triggering components and threshold detectors may be used to provide functionalities of sensor 238 and circuit 240.

It will be appreciated that the movement detection module 222F and the gesture recognition module 222G may be transcribed or otherwise modified into a touch screen environment where the arrangement or covering of vertices is on a rectangular surface rather than a sphere.

In other embodiments, motion sensor 238 may be substituted or combined with a different device, such as a spring-loaded switch, a tilt switch, a gyroscope, a mercury switch, a GPS locator or any other device which can generate a signal responsive to movement or change in orientation of device 10. It is preferable that the device have low quiescent power draw characteristics.

It will be appreciated that modules 222F and 222G and other applications in the embodiments can be implemented using known programming techniques, languages and algorithms. The titles of the modules are provided as a convenience to provide labels and assign functions to certain modules. It is not required that each module perform only its functions as described above. As such, specific functionalities for each application may be moved between applications or separated into different applications. Modules may be contained within other modules. Different signalling techniques may be used to communicate information between applications using known programming techniques. Known data storage, access and update algorithms allow data to be shared between applications. It will further be appreciated that other applications and systems on device 10 may be executing concurrently with any application 222. As such, one or more aspects of modules 222F and 222G may be structured to operate in as a "background" application on device 10, using programming techniques known in the art. The system may be incorporated into any electronic device, such as a communication device, a portable electronic device, a personal computer, a keyboard, keypad or the like. The firmware and software may be implemented as a series of processes and/or modules that provide the functionalities described herein. Interrupt routines may be used. Data may be stored in volatile and non-volatile devices described herein and updated by the hardware, firmware and/or software. Some of the processes may be distributed.

As used herein, the wording "and/or" is intended to represent an inclusive-or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 20% larger and 20% smaller than the stated value may be used. Thresholds, values, measurements and dimensions of features are illustrative of embodiments and are not limiting unless noted.

The present disclosure is defined by the claims appended hereto, with the foregoing description being merely illustrative of a preferred embodiment. Those of ordinary skill may envisage certain modifications to the foregoing embodiments which, although not explicitly discussed herein, do not depart from the scope of the disclosure, as defined by the appended claims.

The invention claimed is:

1. A method for analyzing movements of a handheld electronic device, the method comprising:
    tracking movement data for movements of the handheld electronic device;
    mapping the movement data to a string representation of enumerated symbols arranged in an icosahedral shell defining a spatial coordinate system associated with the handheld electronic device;
    constructing a first matrix of data containing a first part of the string representation and a gesture string representing a gesture related to a command for the handheld electronic device using earlier movement data of the handheld electronic device;
    constructing a second matrix of data containing a second part of the string representation following the first part of the string representation and the gesture string;
    determining if the gesture has been imparted on the handheld electronic device in the movement data straddling the first part of the string representation and the second part of the string representation by calculating a matching score for the first part of the string representation and the second part of the string representation against the gesture string using a Smith-Waterman algorithm by recursively traversing a subset of each of the first and second matrices; and
    if a threshold for the matching score is met, executing a command associated with the gesture of the handheld electronic device.

2. The method for analyzing movements of a handheld electronic device as claimed in claim 1, wherein the spatial coordinate system provides a locus of points from the origin of a coordinate system for the handheld electronic device.

3. The method for analyzing movements of a handheld electronic device as claimed in claim 1, wherein the mapping the movement data to the string representation comprises:

converting the movement data to a movement vector representing the movement;

calculating a total acceleration vector for the handheld electronic device, the total acceleration vector including the movement vector and a tilt vector for the handheld electronic device; and mapping the total acceleration vector against the spatial coordinate system to identify an enumeration symbol of the enumeration symbols that matches the movement.

4. The method for analyzing movements of a handheld electronic device as claimed in claim 3, an accelerometer provides the movement data for the handheld electronic device.

5. The method for analyzing movements of a handheld electronic device as claimed in claim 1, further comprising utilizing a second threshold to discard contiguously repeated enumeration symbols in the string representation.

6. The method for analyzing movements of a handheld electronic device as claimed in claim 1, wherein:

the first matrix is a programming matrix $D(i,j)$, comprising:

dimensions m×n, where m is the length of the first part of the string representation and n is the length of the gesture string, with components of the first part of the string representation being identified with said m dimension and components of said gesture string being identified with said n dimension, a leftmost column $D(i,0)=0, i=0 \ldots m;$ and a top row $D(0,j)=0, j=0 \ldots n;$ remaining elements in the first matrix are set to be the minimum value of 0 or one of:

$$D(i, j) = \max\{0[\text{or}]D(i-1, j) + \text{a gap penalty}[\text{or}]\ D(i, j-1) +$$

$$\text{the gap penalty}[\text{or}]D(i-1, j-1) + \text{the } i,$$

$$j\text{th entry of the substitution matrix } S(i, j);\};$$

and values in the substitution matrix $S(i,j)$ are derived from an adjacency matrix defining relationships of vertices in the icosahedral shell and are based on geometrical relationships between vertices of the spatial coordinate system.

7. The method for analyzing movements of a handheld electronic device as claimed in claim 1, wherein:

the first matrix further contains a second gesture string representing a second gesture related to a second command for the handheld electronic device using earlier movement data of the handheld electronic device;

the second matrix further contains data relating to the second gesture string; and the matching score is compared against the gesture string and the second gesture string to determine if the gesture or the second gesture has been imparted on the handheld electronic device in the movement data.

8. A system for analyzing movements of a handheld electronic device, comprising:

a microprocessor;

a first module to generate movement data for the handheld electronic device responsive to movements of the handheld electronic device;

a non-transitory computer-readable memory including computer processing instructions for the microprocessor, the computer-readable memory including:

a second module providing instructions to the microprocessor to:

map a first part of the movement data to a first string representation of enumerated symbols arranged in an icosahedral shell defining a spatial coordinate system associated with the device relating to at least one of a magnitude, speed and acceleration of a movement detected for the handheld electronic device;

store the first string representation in the computer-readable memory;

map a second part of the movement data following the first part of the movement data to a second string representation of the enumerated symbols arranged in the icosahedral shell relating to at least one of the magnitude, speed and acceleration of the movement detected for the handheld electronic device; and store the second string representation in the computer-readable memory; and a third module providing instructions to the microprocessor to:

construct a first matrix of data containing the first string representation and a gesture string representing a gesture related to a command for the handheld electronic device using earlier movement data of the handheld electronic device;

construct a second matrix of data containing the second string representation and the gesture string;

determine if the gesture has been imparted on the handheld electronic device in the movement data straddling the first part of the movement data and the second part of the movement data by calculating a matching score for the first and second string representations against the gesture string using a Smith-Waterman algorithm by recursively traversing a subset of each of the first and second matrices; and execute a command associated with the gesture on the handheld electronic device when a threshold for the matching score is met.

9. The system for analyzing movements of a handheld electronic device as claimed in claim 8, wherein the second module further provides instructions to the microprocessor to:

convert the movement data to a movement vector representing the movement of the handheld electronic device;

calculate a total acceleration vector for the handheld electronic device, the total acceleration vector including the movement vector and a tilt vector for the device; and map the total acceleration vector against the spatial coordinate system to identify an enumeration symbol of the enumeration symbols that matches the movement of the handheld electronic device.

10. The system for analyzing movements of a handheld electronic device as claimed in claim 9, wherein the first module comprises an accelerometer to provide the movement data for the handheld electronic device.

11. The system for analyzing movements of a handheld electronic device as claimed in claim 8, wherein:

the first matrix is a programming matrix $D(i,j)$, comprising:

dimensions m×n, where m is the length of the first string representation and n is the length of the gesture string, with components of the first string representation being identified with the m dimension and components of the gesture string being identified with the n dimension, a leftmost column $D(i,0)=0$, $i=0 \ldots m$; and a top row $D(0,j)=0$, $j=0 \ldots n$;

remaining elements in the first matrix are set to be the minimum value of 0 or one of:

$$D(i, j) = \max\{0[or]D(i-1, j) + \text{a gap penalty}[or] \ D(i, j-1) + \text{the gap penalty}[or]D(i-1, j-1) + \text{the } i,$$

$jth$ entry of the substitution matrix $S(i, j)\}$;

and values in the substitution matrix $S(i,j)$ are derived from an adjacency matrix defining relationships of vertices in the icosahedral shell.

12. The method for analyzing movements of a handheld electronic device as claimed in claim 6, further comprising:
    initializing a top row of the second matrix by a last row in the first matrix, where
    $D_1(i,j)$ denotes an i, j th entry in the first matrix;
    $D_2(i,j)$ denotes an i, i th entry in the second matrix; and
    $D_2(i=0,j)=D_1(m=last, j)$ for $j=0 \ldots n$.

13. The method for analyzing movements of a handheld electronic device as claimed in claim 6, further comprising: utilizing a current row and a previous row of the first matrix to compute the matching scores.

14. The system for analyzing movements of a handheld electronic device as claimed in claim 8, wherein the third module provides further instructions to the microprocessor to:
    initialize a top row of the second matrix by a last row in the first matrix, where
    $D_1(i,j)$ denotes an i, j th entry in the first matrix;
    $D_2(i,j)$ denotes an i, j th entry in the second matrix; and
    $D_2(i=0,j)=D_1(m=last,j)$ for $j=0 \ldots n$.

15. The system for analyzing movements of a handheld electronic device as claimed in claim 8, wherein the third module provides further instructions to the microprocessor to:
    utilize a current row and a previous row of the first matrix to compute the matching scores.

16. The system for analyzing movements of a handheld electronic device as claimed in claim 8, wherein:
    the third module provides further instructions to the microprocessor to:
        build the first matrix with a second gesture string representing a second gesture related to a second command for the handheld electronic device using earlier movement data of the handheld electronic device;
        build the second matrix with data relating to the second gesture string; and
        compare the matching score against the gesture string and the second gesture string to determine if the gesture or the second gesture has been imparted on the handheld electronic device in the movement data.

* * * * *